(12) United States Patent
Hongu et al.

(10) Patent No.: US 11,812,144 B2
(45) Date of Patent: Nov. 7, 2023

(54) FOCUS ADJUSTMENT APPARATUS AND METHOD, AND IMAGE CAPTURING APPARATUS

(71) Applicant: CANON KABUSHIKI KAISHA, Tokyo (JP)

(72) Inventors: Hideyasu Hongu, Kanagawa (JP); Toshihiko Tomosada, Kanagawa (JP); Motoyuki Asano, Tokyo (JP); Makoto Yokozeki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 234 days.

(21) Appl. No.: 17/475,291

(22) Filed: Sep. 14, 2021

(65) Prior Publication Data

US 2022/0094840 A1   Mar. 24, 2022

(30) Foreign Application Priority Data

Sep. 18, 2020   (JP) .................................. 2020-157676

(51) Int. Cl.
*H04N 23/67*     (2023.01)
*G02B 7/28*      (2021.01)
*G03B 13/36*     (2021.01)
*H04N 23/62*     (2023.01)
*H04N 23/611*    (2023.01)

(52) U.S. Cl.
CPC ............. *H04N 23/67* (2023.01); *G02B 7/282* (2013.01); *G03B 13/36* (2013.01); *H04N 23/62* (2023.01); *H04N 23/611* (2023.01)

(58) Field of Classification Search
CPC ....... H04N 23/67; G06V 40/16; G06V 40/161
See application file for complete search history.

(56) References Cited

U.S. PATENT DOCUMENTS

| 8,224,172 | B2 | 7/2012 | Sasaki |
| 11,258,940 | B2* | 2/2022 | Kasugai ............... H04N 23/633 |
| 2016/0344937 | A1* | 11/2016 | Iwashita ............... H04N 23/80 |
| 2017/0026565 | A1* | 1/2017 | Hong ................... G06V 40/161 |
| 2019/0004400 | A1* | 1/2019 | Ogawa ..................... G01S 3/00 |
| 2019/0045133 | A1* | 2/2019 | Tomosada ............ H04N 23/959 |

(Continued)

FOREIGN PATENT DOCUMENTS

| JP | 2010-097167 A | 4/2010 |
| JP | 5474528 B | 4/2014 |
| JP | 2017-126915 A | 7/2017 |

*Primary Examiner* — Clayton E. LaBalle
*Assistant Examiner* — Diana Hancock
(74) *Attorney, Agent, or Firm* — Cowan, Liebowitz & Latman, P.C.

(57) ABSTRACT

A focus adjustment apparatus comprises a detection unit that detects one or more main subject candidates for a main subject from image signals based on a predetermined first condition, a selection unit that selects the main subject from the one or more main subject candidates, an acquisition unit that acquires operation information of an operation unit for moving a position of a focus lens, and a focus adjustment unit that controls the focus lens so as to focus on the selected main subject in a case where an autofocus mode is set and the operation unit is not operated. In a case where the operation unit is operated, the selection unit selects the main subject based on an in-focus position of the focus lens and fixes the selected main subject.

19 Claims, 19 Drawing Sheets

(56) References Cited

U.S. PATENT DOCUMENTS

2019/0116312 A1\* 4/2019 Funatsu ............... H04N 23/663
2019/0342491 A1\* 11/2019 Mandavilli ........ G06V 40/1365
2021/0337131 A1\* 10/2021 Wada ...................... G02B 7/34
2021/0392264 A1\* 12/2021 Wada ..................... G06V 40/20

\* cited by examiner

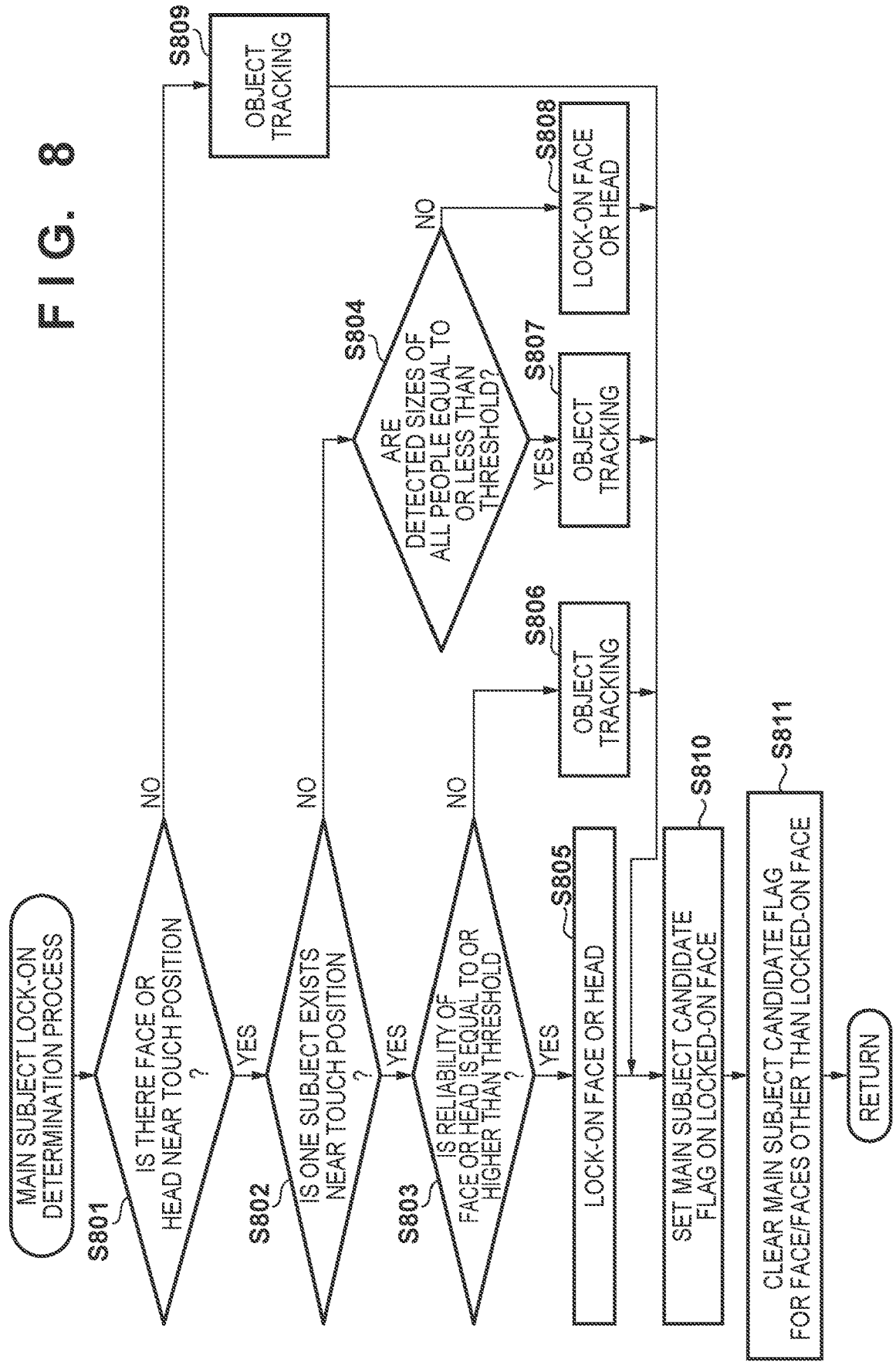

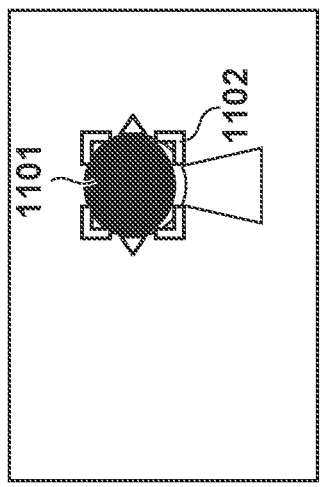
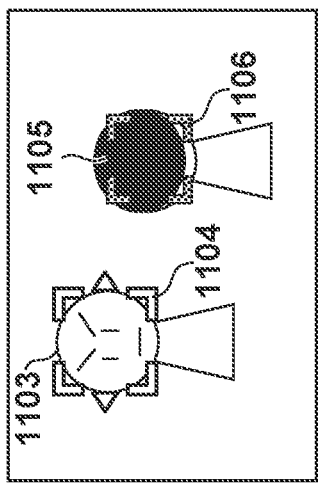
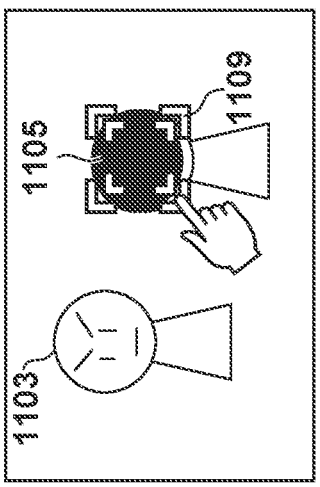
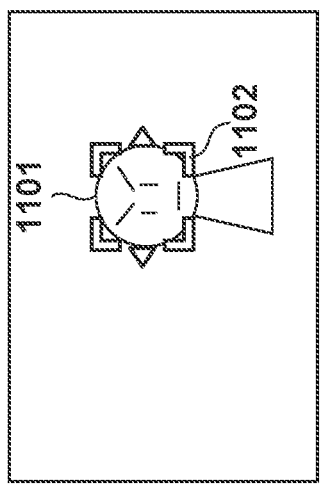
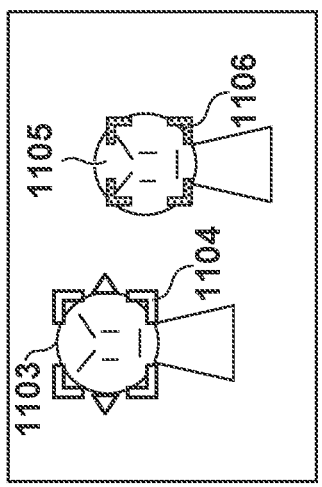
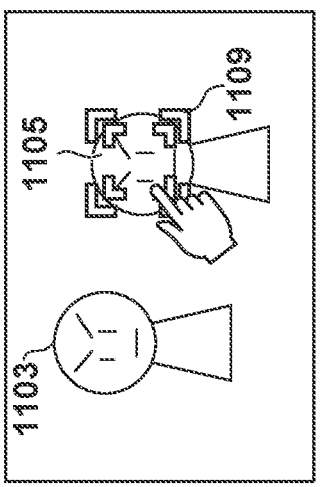
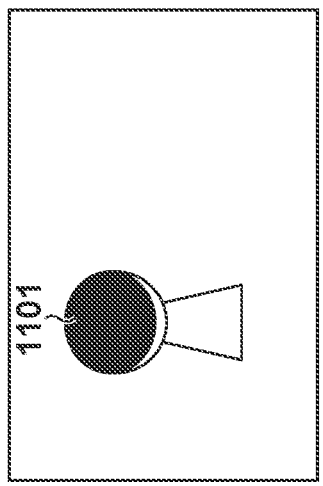
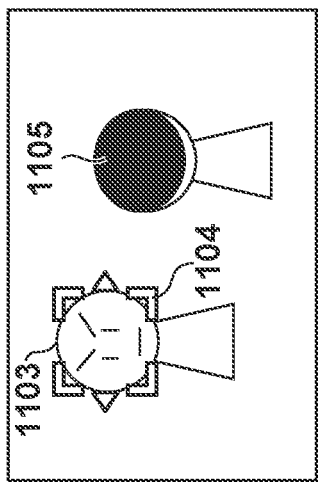
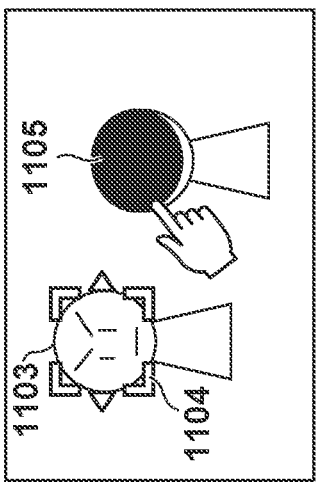

FOCUS ADJUSTMENT APPARATUS AND METHOD, AND IMAGE CAPTURING APPARATUS

BACKGROUND OF THE INVENTION

Field of the Invention

The present invention relates to a focus adjustment apparatus and method, and image capturing apparatus.

Description of the Related Art

In the conventional autofocus (AF) control, there are cases in which a user has to specify an AF frame around a subject that the user wishes to focus. However, for example, in a shoulder-carrying type camera or the like used for collecting news materials or the like, it may be difficult to set an operating device for operating an AF frame at a position on the camera where the operator can easily operate it.

Accordingly, Japanese Patent Laid-Open No. 2010-97167 discloses a technique for automatically setting an AF frame around a subject that was focused through a manual focus (MF) operation performed by an operator.

Further, Japanese Patent No. 5474528 discloses a technique for, in a case where a focused position is within a face detection area as a result of a manual focus operation performed by an operator, performing automatic tracking and AF by setting an AF frame around a face if the face is detected or around a subject other than a face if no face is detected.

On the other hand, image processing that automatically detects a specific subject from an image is known. For example, in a digital camera or a digital video camera, a person's face is particularly detected from a captured image, and the detection result is used as a control target to optimize the focus state and exposure state. However, with general face detection technology, stable detection may not be performed in a case where sufficient facial features are not obtained, such as in a case where a person faces backward or wears ornaments on the face.

In consideration of the above, Japanese Patent Laid-Open No. 2017-126915 suggests a method of detecting a person's upper body or head portion from an image and using an area of the person's upper body, the head portion, or a face area estimated from the detection results as a control target. With this method, the face area of the person can be stably specified even when the person faces backward or wears ornaments on the face.

However, skillful technique is required to focus on a subject by MF operation, and it is difficult to move the focus lens smoothly to the in-focus position. Further, in recent years, the resolution has been increased to 4K resolution and further to 8K resolution due to the increase in the number of pixels, and it has become very difficult to confirm the in-focus position on the monitor provided on the camera. Therefore, the operation by the operator to perform the manual focus operation until the face is substantially in focus as described in the technique described in Japanese Patent No. 5474528 may cause deterioration of moving image quality when the skill of the operator for the manual focus operation is not sufficient or when blurring of an image occurs due to the resolution of the monitor.

On the other hand, in the method of tracking a subject using the face detection technique described in Japanese Patent Laid-Open No. 2017-126915, there is a problem that, when the user wants to focus on an arbitrary subject on the screen different from a tracking subject, it is not possible to change the subject to be tracked.

SUMMARY OF THE INVENTION

The present invention has been made in consideration of the above situation, and enables automatic determination of a main subject to be focused on as well as flexible change of the main subject according to the user's intention.

According to the present invention, provided is a focus adjustment apparatus comprising: a detection unit that detects one or more main subject candidates which are candidates for a main subject from image signals repeatedly output from an image sensor that performs photoelectric conversion on light that is incident through an imaging optical system based on a predetermined first condition; a selection unit that selects the main subject from the one or more main subject candidates; an acquisition unit that acquires operation information of an operation unit for moving a position of a focus lens included in the imaging optical system; and a focus adjustment unit that controls the focus lens so as to focus on the main subject selected by the selection unit in a case where an autofocus mode is set and the operation unit is not operated, wherein the selection unit selects the main subject based on an in-focus position of the focus lens and fixes the selected main subject in a case where the operation unit is operated, and wherein each unit is implemented by one or more processors, circuitry or a combination thereof.

Further, according to the present invention, provided is an image capturing apparatus comprising: an image sensor; and a focus adjustment apparatus comprising: a detection unit that detects one or more main subject candidates which are candidates for a main subject from image signals repeatedly output from the image sensor that performs photoelectric conversion on light that is incident through an imaging optical system based on a predetermined first condition; a selection unit that selects the main subject from the one or more main subject candidates; an acquisition unit that acquires operation information of an operation unit for moving a position of a focus lens included in the imaging optical system; and a focus adjustment unit that controls the focus lens so as to focus on the main subject selected by the selection unit in a case where an autofocus mode is set and the operation unit is not operated, wherein the selection unit selects the main subject based on an in-focus position of the focus lens in a case where the operation unit is operated and fixes the selected main subject, and wherein each unit is implemented by one or more processors, circuitry or a combination thereof.

Furthermore, according to the present invention, provided is a focus adjustment method comprising: detecting one or more main subject candidates which are candidates for a main subject from image signals repeatedly output from an image sensor that performs photoelectric conversion on light that is incident through an imaging optical system based on a predetermined first condition; selecting the main subject from the one or more main subject candidates; acquiring operation information of an operation unit for moving a position of a focus lens included in the imaging optical system; and controlling the focus lens so as to focus on the selected main subject in a case where an autofocus mode is set and the operation unit is not operated, wherein the main subject is selected based on an in-focus position of the focus lens and the selected main subject is fixed in a case where the operation unit is operated.

Further, according to the present invention, provided is a non-transitory computer-readable storage medium, the storage medium storing a program that is executable by the computer, wherein the program includes program code for causing the computer to function as a focus adjustment apparatus comprising: a detection unit that detects one or more main subject candidates which are candidates for a main subject from image signals repeatedly output from an image sensor that performs photoelectric conversion on light that is incident through an imaging optical system based on a predetermined first condition; a selection unit that selects the main subject from the one or more main subject candidates; an acquisition unit that acquires operation information of an operation unit for moving a position of a focus lens included in the imaging optical system; and a focus adjustment unit that controls the focus lens so as to focus on the main subject selected by the selection unit in a case where an autofocus mode is set and the operation unit is not operated, wherein the selection unit selects the main subject based on an in-focus position of the focus lens and fixes the selected main subject in a case where the operation unit is operated.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a flowchart of a main subject lock-on determination process according to the first embodiment.

FIGS. 11A to 11I are conceptual diagrams showing examples of displayed frames showing a main subject candidate and a main subject according to the first embodiment.

DESCRIPTION OF THE EMBODIMENTS

Figure 1:
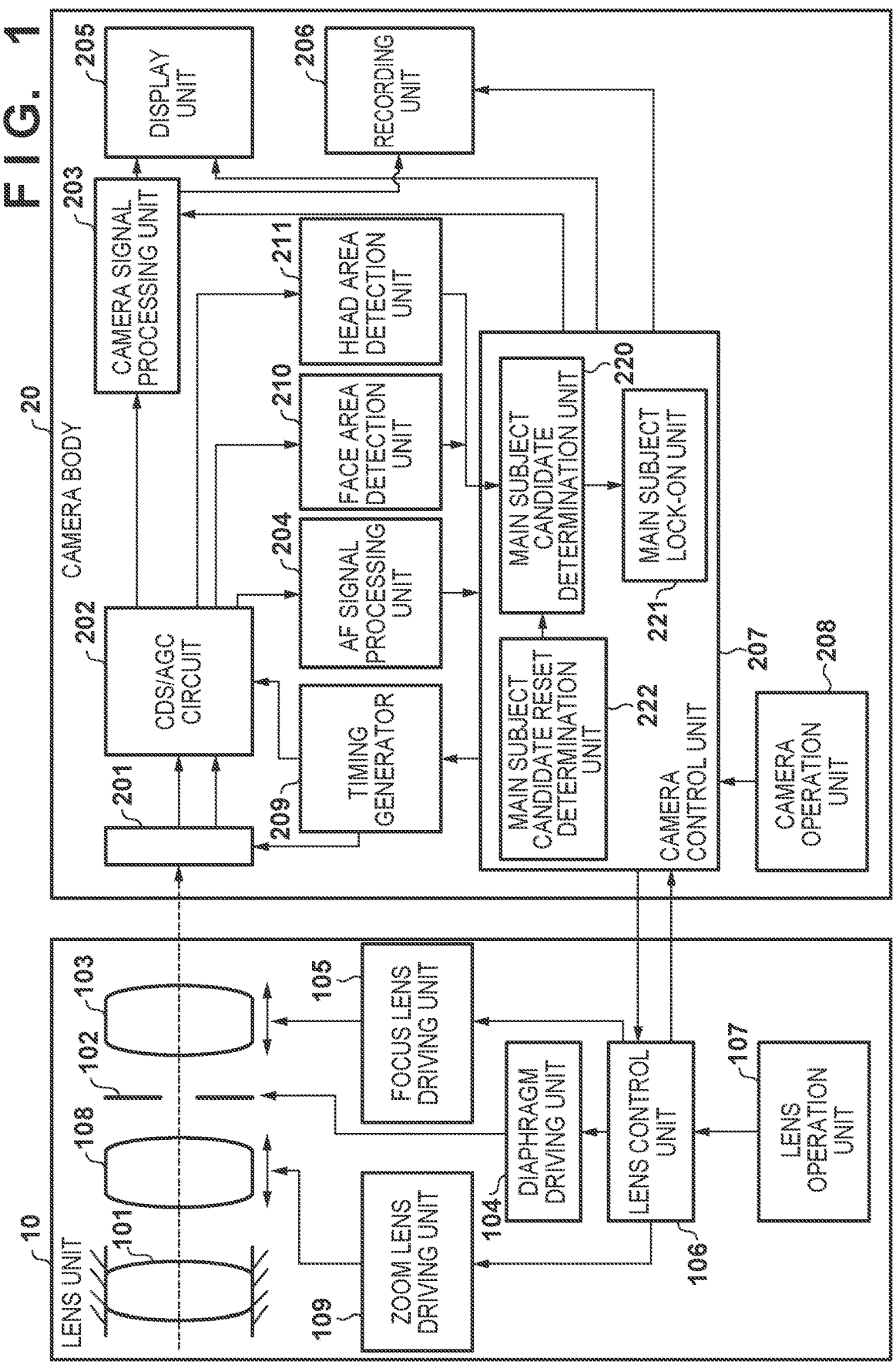
FIG. 1 is a block diagram showing a configuration of a digital video camera system according to a first embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Hereinafter, a first embodiment of the present invention will be described in detail. In the following embodiment, a digital video camera system will be described as an example of an image capturing apparatus, but the present invention is not limited to this.

FIG. 1 is a block diagram showing a configuration of a lens interchangeable type digital video camera system according to an embodiment of the present invention. The camera system in the present embodiment is composed of a lens unit 10 and a camera body 20, and a lens control unit 106 that controls the operation of the entire lens unit 10 and a camera control unit 207 that controls the operation of the entire camera system exchange data. In the present embodiment, the camera control unit 207 is composed of a processor such as a CPU and an MPU and storage media such as a memory. Further, the camera control unit 207 may include an arithmetic circuit, and the arithmetic circuit may execute some arithmetic functions performed by the processor. In the present embodiment, a lens interchangeable type camera system in which the lens unit 10 is detachable from the camera body 20 will be described as an example, but the present invention can also be applied to a camera integrated with a lens unit.

First, the configuration of the lens unit 10 will be described. The lens unit 10 has an imaging optical system including a fixed lens 101, a zoom lens 108, a diaphragm 102, and a focus lens 103. The diaphragm 102 is driven by a diaphragm driving unit 104 and controls the amount of light to be incident on an image sensor 201, which will be described later. The focus lens 103 is driven by a focus lens driving unit 105 to adjust the focus. The zoom lens 108 is driven by a zoom lens driving unit 109 to adjust the zoom magnification. A lens unit 10 without a zoom function may be used.

The diaphragm driving unit 104, focus lens driving unit 105, and zoom lens driving unit 109 are controlled by the lens control unit 106, and the aperture amount of the diaphragm 102 and the positions of the focus lens 103 and the zoom lens 108 are determined. When the user performs operations for changing aperture, focus, and zoom magnification via a lens operation unit 107, the lens control unit 106 controls the lens unit 10 according to the user operation. Further, the lens control unit 106 controls the diaphragm driving unit 104, the focus lens driving unit 105, and the zoom lens driving unit 109 according to control commands and control information, described later, received from the camera control unit 207. Further, the lens control unit 106 transmits lens information (for example, MF operation information and information on the imaging optical system) to the camera control unit 207.

Next, the configuration of the camera body 20 will be described. The camera body 20 is configured to be able to acquire an image signal and AF signals converted from the luminous flux that has passed through the imaging optical system of the lens unit 10. The image sensor 201 is configured with a CCD, a CMOS sensor, or the like. The luminous flux that has passed through the imaging optical system is incident on the light receiving surface of the image sensor 201, and a formed subject image is converted by photodiodes into electric charge (photoelectric conversion) according to the amount of incident light. Based on the drive pulses given from a timing generator 209 according to the instruction from the camera control unit 207, the electric charge accumulated in each photodiode is read out from the image sensor 201 in the form of voltage signals as an image signal and an AF signal.

The image signal and AF signal read out from the image sensor 201 are input to a CDS/AGC circuit 202, and correlation double sampling for removing reset noise, gain adjustment, and signal digitization are performed. Then, the CDS/AGC circuit 202 outputs the obtained image data to a camera signal processing unit 203, a face area detection unit 210, and a head area detection unit 211, and outputs the AF data to an AF signal processing unit 204.

The camera signal processing unit 203 transmits the image data output from the CDS/AGC circuit 202 to a display unit 205. The display unit 205 is a display device (display member) configured with an LCD, an organic EL, or the like, and displays an image based on image data. Further, in the mode for recording an image, the image data is recorded in a recording unit 206.

The AF signal processing unit 204 calculates information on the focus state and reliability by a known method based on the AF data output from the CDS/AGC circuit 202. As information on reliability, contrast information, there are saturation information, defect information, etc., and, in the case of an image sensor 201 corresponding to the so-called on-imaging plane phase difference method, degree of two-image matching, degree of two-image steepness, etc. Then, the calculated focus state and reliability information are output to the camera control unit 207.

The face area detection unit 210 performs a known face detection process on the image data output from the CDS/AGC circuit 202, and detects the face area of a person in the shooting screen. That is, the face area detection unit 210 detects a predetermined subject (here, a face) from the image data. The obtained face detection result is transmitted to the camera control unit 207. As the face detection process performed by the face area detection unit 210, for example, an area having an attribute of a color of skin is extracted using information of tone of each pixel represented by the image data, then the face is detected using the degree of matching between the detected area with the contour plate of the face prepared in advance. Alternatively, there is a method of performing face detection by extracting facial feature points such as eyes, nose, and mouth using a well-known pattern recognition technique; however, the present invention is not limited by the method of face detection processing, and any method may be used. Further, the subject is not limited to the face, and may be a subject other than the face of a person.

The head area detection unit 211 detects a head area which is an area related to the face area detected by the face area detection unit 210 as the target subject area from the image. That is, the head area detection unit 211 detects a predetermined subject (here, the head) related to the predetermined subject detected by the face area detection unit 210 from the image data. In the head area detection in the present embodiment, the head area is detected from the image data based on the learning data, and the detection result is transmitted to the camera control unit 207.

The camera control unit 207 sends information to the AF signal processing unit 204 to set a focus detection area at a position so as to include the face area and the head area on the shooting screen based on the face detection result of the face area detection unit 210 and the head detection result of the head area detection unit 211. In the first embodiment, when a face is detected, the focus detection area is set based on the position and size of the face area. On the other hand, when the face is not detected and only the head area is detected, the focus detection area is set based on the position and size of the head area. Note that when only the head area is detected, the position and size of the face area of the subject may be estimated from the head detection result, and the focus detection area may be set based on the estimated position and size of the face area.

In addition, the camera control unit 207 performs control by exchanging information with each constituent of the camera body 20, and in addition to the processes within the camera body 20, executes camera functions instructed by a user in response to the input from a camera operation unit 208. The camera functions instructed by the user include, for example, power ON/OFF, setting change, start of recording, switching of AF (autofocus)/MF (manual focus) control, confirmation of recorded images, and so forth. In addition, as described above, the camera control unit 207 exchanges information with the lens control unit 106 in the lens unit 10, sends control commands and control information for the imaging optical system, and acquires the information of the lens unit 10. In addition, the camera control unit 207 calculates the drive amount of the focus lens 103 so as to achieve the in-focus state using the information of lens unit 10 received from lens control unit 106 and the focus state and reliability information from the AF signal processing unit 204.

Further, the camera control unit 207 includes a main subject candidate determination unit 220, a main subject lock-on unit 221 and a main subject candidate reset determination unit 222. The main subject candidate determination unit 220 determines whether or not a detected subject can be a candidate for the main subject based on the face detection result obtained by the face area detection unit 210 and the head detection result obtained by the head area detection unit 211. Then, among the subjects determined to be candidates for the main subject, the main subject is selected through the main subject determination process described later, and a frame indicating the main subject and a frame/frames indicating the main subject candidate/candidates are superimposed on the captured image on the display unit 205 or the like.

Figure 2A:
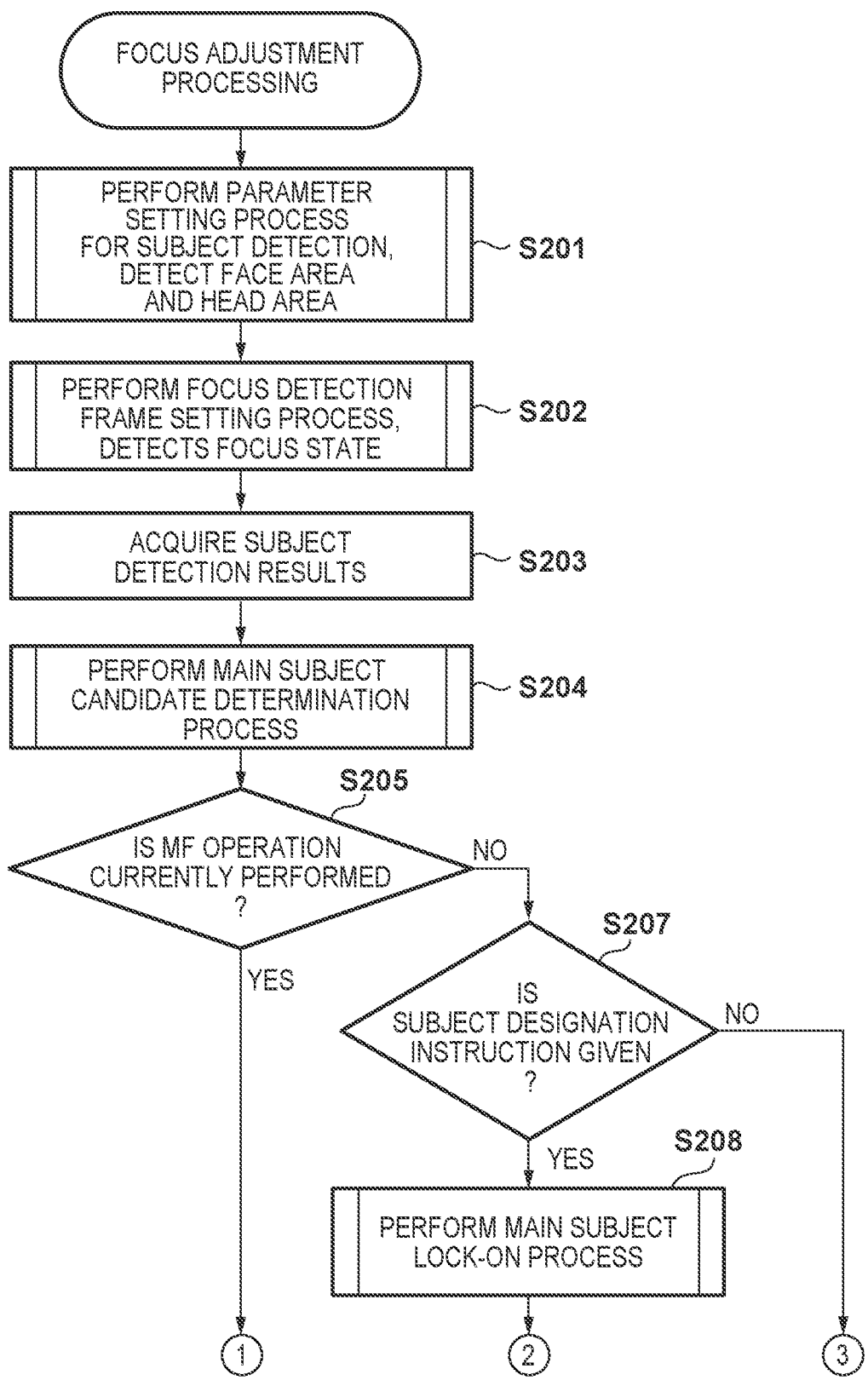
FIGS. 2A and 2B show a flowchart of focus adjustment processing according to the first embodiment.
Figure 2B:
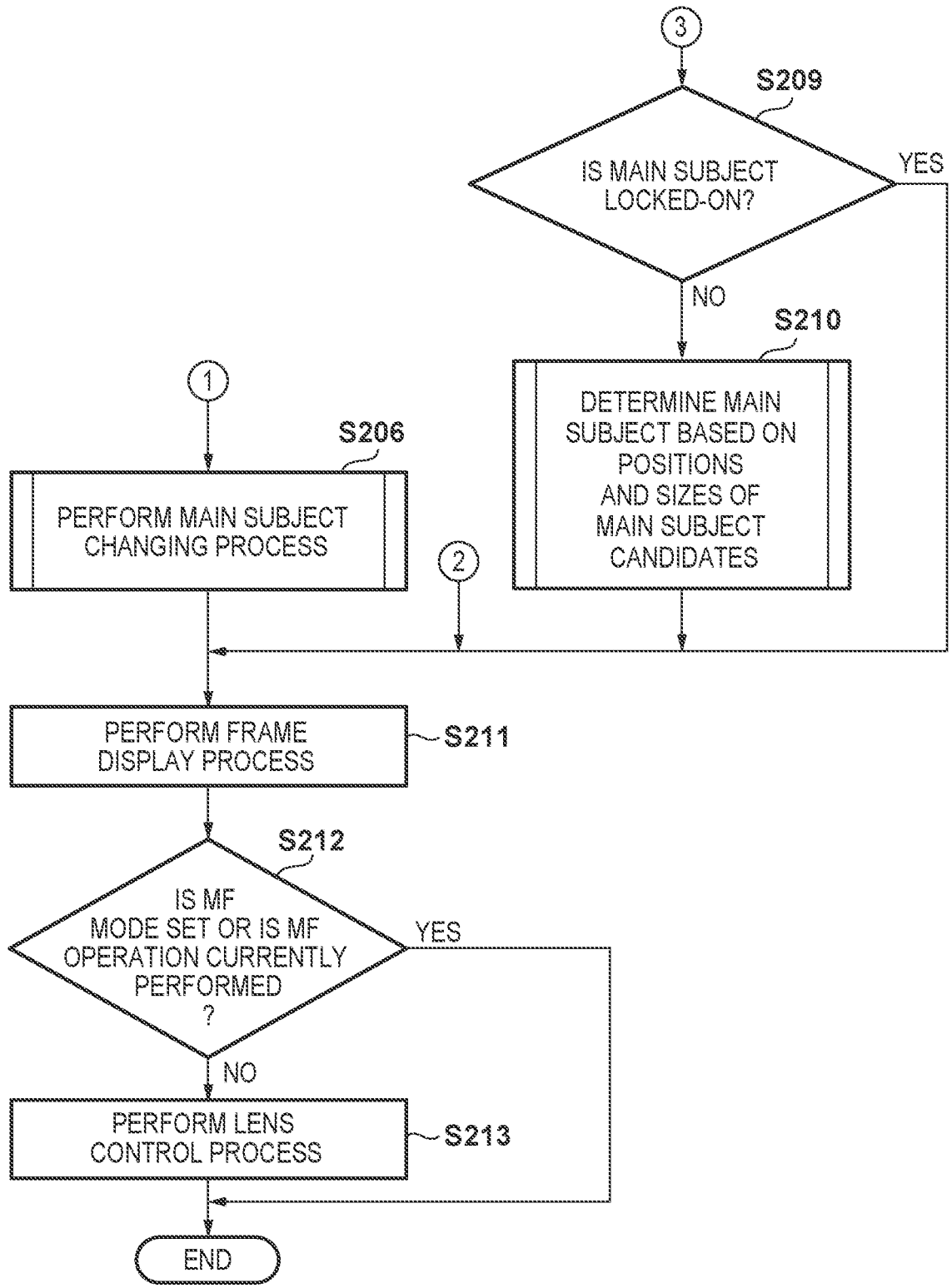

Next, focus adjustment processing in the first embodiment will be described with reference to FIGS. 2A and 2B. The focus adjustment processing in the first embodiment is characterized by control based on the detection results of the face area and the head area by the face area detection unit 210 and the head area detection unit 211. This focus adjustment processing is executed according to a computer program stored in the camera control unit 207. Further, the series of the focus adjustment processing described below assumes to be performed by a system that performs the focus adjustment process in synchronization with an image shooting cycle, but the present invention is not limited to this.

First, in step S201, the face area detection unit 210 performs a parameter setting process for subject detection to set parameters used for subject detection. The details of the parameter setting process will be described later with reference to FIG. 3. Then, the face area is detected by the face area detection unit 210 and the head area is detected by the head area detection unit 211 using the set parameters according to AF or MF. After that, the process proceeds to step S202.

Next, in step S202, the AF signal processing unit 204 performs a focus detection frame setting process that sets a focus detection frame/frames for the AF signal output from the CDS/AGC circuit 202, and detects a focus state for each focus detection frame. The focus detection frame setting process performed here will be described later with reference to FIGS. 4A and 4B. After that, the process proceeds to step S203.

In step S203, the face detection result by the face area detection unit 210, the head detection result by the head area detection unit 211, and a tracking search result are acquired, subject information is generated, and the process proceeds to step S204. The subject information generated here includes information about detection ID, face detection result, head detection result, tracking search result, position and size of subject area, main subject candidate flag, main subject flag, main subject lock-on flag, and focus detection result.

The detection ID is assigned to a subject detected by the camera control unit 207 based on the acquired face detection result and the head detection result. At that time, the camera control unit 207 determines the face area and the head area, and assigns the same detection ID to the face area and the head detection result determined to belong to the same subject. Further, a tracking search process for determining whether or not the same subject detected in the current frame is also detected in the immediately previous frame is performed. This tracking search process may be performed by using a known method such as template matching or histogram matching using the image of the immediately previous frame, for example. When it is determined as a result of the tracking search process that the same subject exists in the image of the immediately previous frame, the same detection ID as the detection ID assigned to the subject in the image of the immediately previous frame is assigned to the subject detected in the current frame.

The face detection result is information on the position and size of the face area detected by the face area detection unit 210, and the head detection result is information on the position and size of the head area detected by the head area detection unit 211. Instead of the face detection result and the head detection result, information indicating whether or not information about a detected face area and a detected head area exists and, if exists, a link for accessing that information may be retained.

The tracking search result indicates information on whether or not the same subject was found in the image of the previous frame as a result of the tracking search process described above.

The subject area indicates information regarding the position and size of the subject determined based on the face detection result and the head detection result.

The main subject candidate flag indicates information added in the main subject candidate determination process performed in step S204 described later. The main subject flag is information added in a main subject changing process performed in step S206 and a main subject lock-on determination process performed in step S208, which will be described later, and is set for only one subject. The main subject lock-on flag is information also added in the main subject changing process performed in step S206 and the main subject lock-on determination process performed in step S208, which will be described later, and is used when fixing the main subject flag. As for the information of these flags, when the same subject is present in the image of the immediately previous frame, the information with the same detection ID is inherited in step S203.

The focus detection result shows the focus state detected in step S202.

In step S204, the camera control unit 207 performs the main subject candidate determination process in which the candidate/candidates for the main subject are determined among the subject/subjects detected in step S203 and the main subject candidate flag is set. This process will be described later with reference to FIGS. 5A and 5B. After that, the process proceeds to step S205.

In step S205, MF operation is currently performed or not is determined. Information about MF operation is acquired by the lens operation unit 107 or the camera operation unit 208, and basically indicates one of the following three cases.

(Case 1) Set to the MF Mode and Directly Operate the Lens Unit 10

By switching an AF/MF switch (not shown) attached to the lens unit 10 by the lens operation unit 107, or by switching between AF mode (autofocus mode) and MF mode (manual focus mode), both modes are not shown, on a camera menu by the camera operation unit 208, the lens is set to a state in which MF operation is possible. In that state, the lens operation unit 107 is directly operated to drive the focus lens driving unit 105.

(Case 2) Set to the MF Mode and Operate the Lens Unit 10 from the Camera Body 20

The camera operation unit 208 switches to the MF mode (not shown) using the menu of the camera body 20, thereby setting the lens unit 10 to the state in which MF operation is possible. In that state, the user sets the driving information for manual operation, and the information is sent to the lens control unit 106 via the camera control unit 207 to drive the focus lens driving unit 105.

(Case 3) Set to the AF Mode and Directly Operate the Lens Unit 10

While the lens unit 10 and camera body 20 are set to the AF mode, the lens operation unit 107 is directly operated to drive the focus lens driving unit 105. In this state, AF operation is restored when the MF operation ends.

If the MF operation is currently performed, the process proceeds to step S206, and if the MF operation is not currently performed, the process proceeds to step S207.

In step S206, the main subject changing process is performed in which the subject that the user wants to shoot is specified from the subjects on which the main subject candidate flag is set and then the main subject flag is set on the specified subject. This process will be described later with reference to FIG. 6. After that, the process proceeds to step S211.

On the other hand, in step S207, it is determined whether or not a subject designation instruction is given by a user from the camera operation unit 208. If it is determined that the subject designation instruction is given, the process proceeds to step S208, and if not, the process proceeds to step S209. As a subject designation method, for example, a method of designating the subject on a touch panel or a method of designating the subject by pressing a cross key whose direction and pressed state are detected may be considered.

In step S208, a main subject lock-on process is performed by the main subject lock-on unit 221. The main subject lock-on process is a process of determining the main subject based on the user instruction regardless of the result of the main subject candidates determined in step S204. This process will be described later with reference to FIG. 8. After that, the process proceeds to step S211.

In step S209, it is determined whether or not the main subject is locked-on by determining the presence or absence of the main subject lock-on flag set by the process described later in step S208. If the main subject is not locked-on, the process proceeds to step S210, and if the main subject is locked-on, the process proceeds to step S211.

In step S210, the main subject is determined based on the position and size of each main subject candidate determined in the main subject candidate determination process in step S204. As parameters for determining the main subject, not only the position and size, but also the reliability of the results of face detection and head detection, orientation of the face and head, and whether both face and head are detected or only one of them is detected, and so forth, may be used. Further, the main subject may be determined from the main subject candidate/candidates by using a known algorithm.

In step S211, a frame display process of displaying a frame around each subject on which the main subject candidate flag is set in the display unit 205 to notify the user of the main subject candidate/candidates is performed. Specifically, for the main subject determined in S206, S208, and S210, a main subject frame indicating that the subject is the main subject is displayed around the face portion or the head portion. In addition, among the subjects on which the main subject candidate flag is set, a candidate frame indicating that the subject is the main subject candidate is displayed around the face portion or head portion of the subject on which the main subject flag is not set. Further, when the main subject lock-on flag is set, only the main subject frame is displayed around the face portion or head portion of the main subject, and the candidate frame is not displayed around the face portion or head portion of the subject on which the main subject candidate flag is set.

In step S212, it is determined whether or not the MF mode is set or MF operation is currently performed. If the MF mode is set or the MF operation is currently performed, the process proceeds to step S213 where a lens control process for sending a drive command for the focus lens 103 to the lens control unit 106 based on the focus detection result of the main subject on which the main subject flag is set. If there is no subject on which the main subject flag is set, for example, a focus detection frame is set in the center of the screen, and the lens control process is performed based on the focus detection result or the like of the set focus detection frame. Since a conventional method may be used for the focus detection method and the lens control process, detailed description thereof will be omitted here.

If the MF mode is set or the MF operation is currently performed, as the user is operating the focus lens 103, so the process ends.

Figure 3:
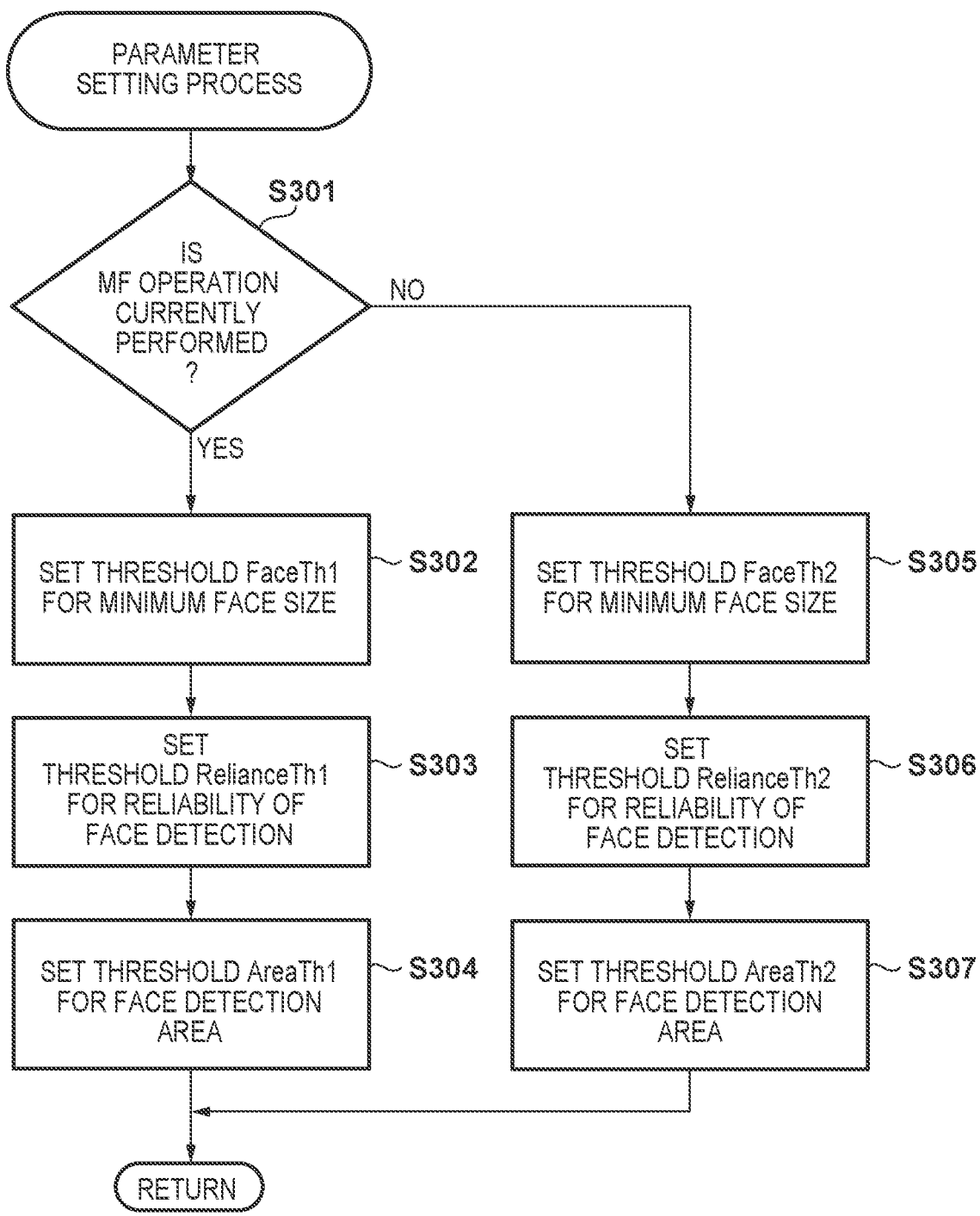
FIG. 3 is a flowchart of a parameter setting process according to the first embodiment.

Next, the parameter setting process performed in step S201 will be described with reference to FIG. 3. The parameter setting process is a process for setting the parameters referred to by the face area detection unit 210. In the present embodiment, different thresholds are set depending on whether the MF operation is currently performed or not, and while the MF operation is performed, control is made so that even a small face or a face with low reliability is easily detected in order to detect the subject aimed at by the user.

First, in step S301, it is determined whether or not the MF operation is currently performed. The determination here is made by determining whether or not the operation according to any of the above-mentioned three cases is performed. If the MF operation is currently performed, the process proceeds to step S302, and if not, the process proceeds to step S305.

In step S302, a threshold FaceTh1 for the detectable minimum face size is set. For example, if the threshold FaceTh1 is set by the pixel size on the image sensor 201 and a face having a size of 15 pixels or more is desired to be detected, "15" is set.

Next, in step S303, a threshold RelianceTh1 for the reliability of the face detection is set. For example, if the reliability of the face detection result is expressed with 10 steps and it is desired to detect a face having a reliability of 3 or more, "3" is set.

Then, in step S304, a threshold AreaTh1 for the face detection area is set, and the process ends. For example, if it is desired to set an area where the face detection is to be performed to 90% of the screen, "90" is set.

On the other hand, if it is determined in step S301 that the MF operation is not currently performed, the process proceeds to step S305 and a threshold FaceTh2 for the detectable minimum face size is set. For example, if the threshold FaceTh2 is set by the pixel size on the image sensor 201 and a face having a size of 25 pixels or more is desired to be detected, "25" is set.

Next, in step S306, the threshold RelianceTh2 for the reliability of the face detection is set. For example, if the reliability of the face detection result is expressed with 10 steps and it is desired to detect a face having a reliability of 6 or more, "6" is set.

Then, in step S307, a threshold AreaTh2 for the face detection area is set, and the process ends. For example, if it is desired to set an area where the face detection is to be performed to 80% of the screen, "80" is set.

The relationships between the above thresholds are FaceTh1<FaceTh2, RelianceTh1<RelianceTh2, and AreaTh1>AreaTh2, so that a face is detected easier while the MF operation is performed. As described above, while the MF operation is performed, the lower limit of the minimum face size is made smaller, the lower limit of the reliability of face detection is made lower, and the face detection area is widened compared to a case where the MF operation is not performed.

Figure 9A:
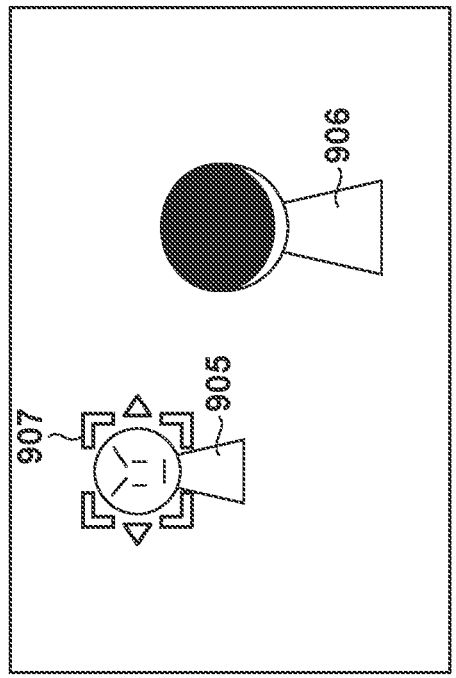
FIGS. 9A to 9D are conceptual diagrams showing examples of displayed frames showing a subject detected while MF operation is performed and while the MF operation is not performed according to the first embodiment.

The subject detection result obtained in a case where the parameters are set as described above will be described with reference to FIGS. 9A and 9B. FIG. 9A shows a case where subjects 901 and 902 are included in the screen while the MF operation is not performed. In this case, the subject 901 is detected by the subject detection, but the subject 902 is not detected because the face is smaller than the threshold FaceTh2 for the minimum face size set in step S305. Further, when the subject 902 is located in the periphery of the screen and is outside the threshold AreaTh2 for the face detection area set in step S307, it is unlikely to be the main subject in the first place, so it is restricted so that the subject detection will not be performed in that area.

When the subject 901 is determined as the main subject by the process in step S208 or S210 based on such a subject detection result, a main subject frame 903 indicating that the subject 901 is the main subject is displayed in step S211. On the other hand, no frame is displayed around the subject 902. Further, only the subject 901 is subjected to the focus detection process.

Figure 9C:
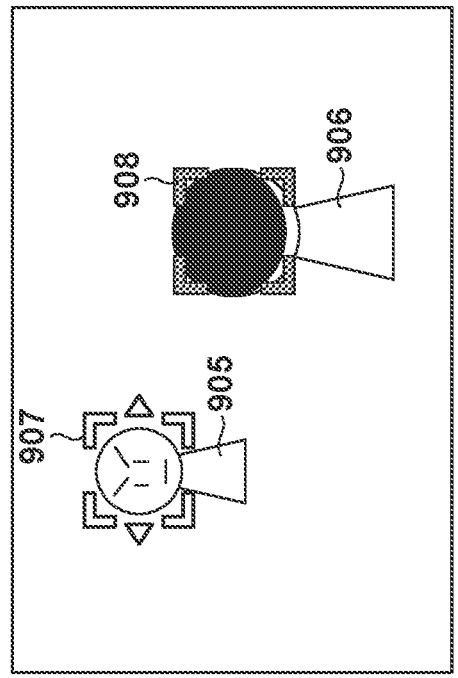
Figure 9B:
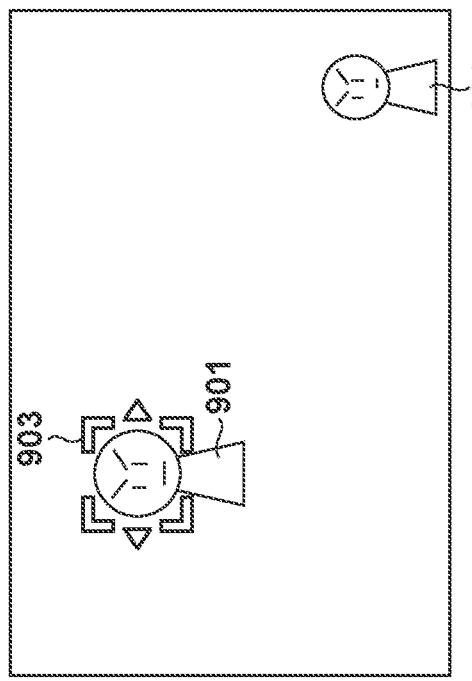

FIG. 9B shows a case where the subjects are the same as those of FIG. 9A and the MF operation is currently performed. While the MF operation is performed, the user may intentionally perform a focus operation on the subject 902. Therefore, by lowering the threshold for face detection to expand the face detection area so that more face can be easily detected, both the subjects 901 and 902 are detected.

When the subject 901 is determined as the main subject by the process in step S206 based on such a subject detection result, the main subject frame 903 indicating the main subject is displayed around the subject 901 in step S211. Further, a candidate frame 904 is displayed around the subject 902, and both the subjects 901 and 902 are subject to the focus detection process. In this way, while the MF operation is performed, by additionally using the subject that is not a candidate for the main subject while the MF operation is not performed as a target of the focus detection process, changing of the main subject that reflects the user's intention becomes possible.

Next, the focus detection frame setting process performed in step S202 will be described with reference to FIGS. 4A and 4B. The focus detection frame setting process is a process of setting focus detection frames in a mesh pattern on an imaging surface, and focus detection is performed based on AF signals obtained from each frame.

In the present embodiment, the methods of setting the focus detection frames differ depending on whether the MF operation is currently performed or not. In step S202, if the MF operation according to any of the above-mentioned (Case 1) to (Case 3) is detected, it is determined that the MF operation is currently performed. Then, depending on the determination result, the focus detection frames corresponding to a case where the MF operation is currently performed or the focus detection frames corresponding to a case where the MF operation is not currently performed are set.

Figure 4A:
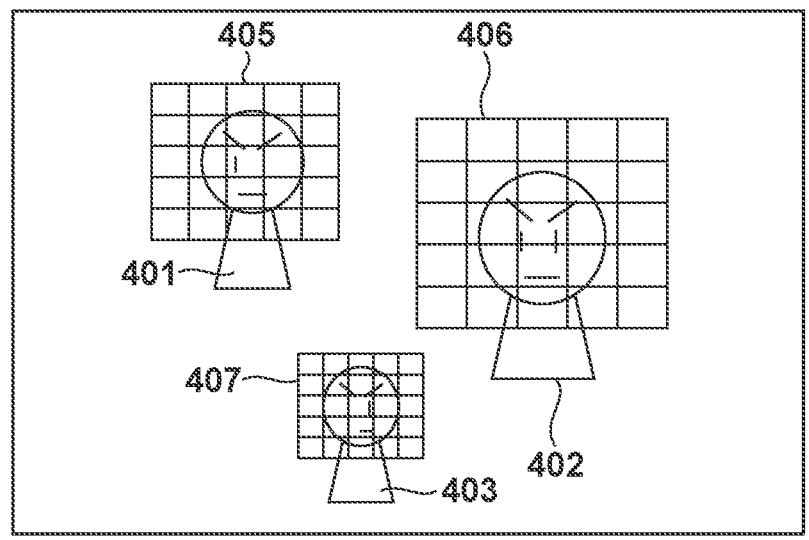
FIGS. 4A and 4B are diagrams for explaining a focus detection frame setting process according to the first embodiment.
Figure 4B:
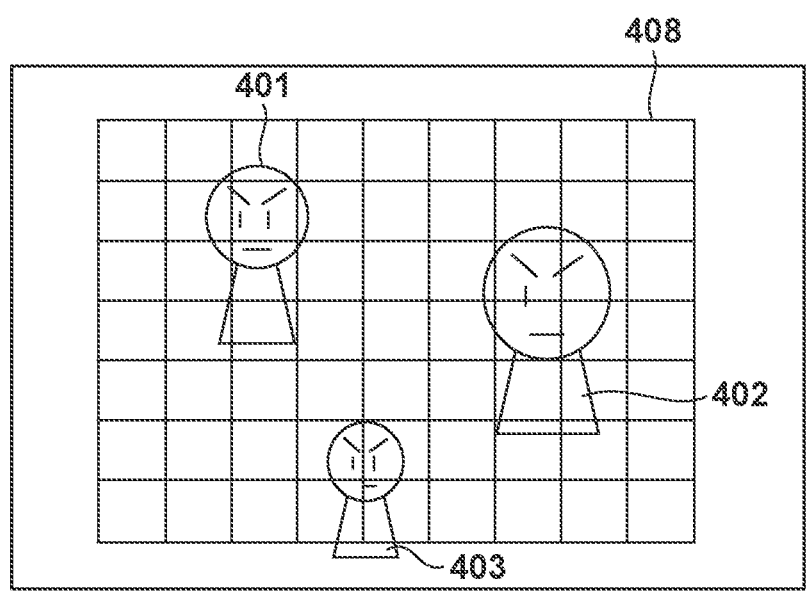

In FIGS. 4A and 4B, subjects 401, 402, and 403 show examples of subjects detected by the face area detection unit 210 and head area detection unit 211 in step S202 using the parameters set in step S201. FIG. 4A shows a method of setting the focus detection frames while the MF operation is not performed, and focus detection frames 405, 406, and 407 are set for the subjects 401, 402, and 403 according to the sizes of the subjects. This setting method has the following merits.

Efficient focus detection process is possible by excluding unnecessary parts other than the subject.

The size of the frame is changed according to the size of the subject, and a stable focus detection result is achieved since a large focus detection frame is not set for a small face, which reduces perspective competition within the frame.

In the example shown in FIG. 4A, the focus detection frame is set for each subject for the sake of explanation, however, while the MF operation is not performed, the focus is adjusted only on the subject to which the main subject flag is set. Therefore, only one focus detection frame may be set.

FIG. 4B shows a method of setting the focus detection frames in a case where the MF operation is currently performed. In a case where the MF operation is currently performed, the mesh-shaped frame 408 is set around the center of the screen regardless of the subject detection result. This setting method has the following merits.

The focus detection results of multiple subjects can be acquired at once.

Even if the number of subjects detected by subject detection increases, the number of focus detection frames does not increase.

In this way, by changing the method for setting the focus detection frames between the case where the MF operation is currently performed and the case where the MF operation is not currently performed, stable focus adjustment becomes possible while the MF operation is not performed. On the other hand, by efficiently acquiring the focus detection results of a plurality of subjects while the MF operation is performed, it is possible to quickly respond to the changing of the main subject.

Next, the main subject candidate determination process performed in step S204 will be described with reference to FIGS. 5A and 5B. This process is performed by the camera control unit 207 for setting the main subject candidate flag on a subject that is a candidate for the main subject among the subjects detected in step S203. The main subject candidate flag is a flag that indicates a subject which may be determined as the main subject among the subjects found as face detection results.

First, among the subject information acquired in step S203, the presence or absence of a face detection result is determined for one detection ID in step S501. If there is a face detection result, the process proceeds to step S502, and if there is no face detection result, the process proceeds to step S503. In step S502, the position and size of the face area are stored as the information on the subject area. After that, the process proceeds to step S510.

In step S503, it is determined whether or not the MF operation is currently performed. If the MF operation is currently performed, the process proceeds to step S504, and if not, the process proceeds to step S506.

In step S504, it is determined whether or not there is a head detection result. If there is a head detection result, the process proceeds to step S505. On the other hand, if there is no head detection result, the process proceeds to step S512, the main subject candidate flag is cleared, and then the process proceeds to step S517.

In step S505, the position and size of the head area of the subject are stored as the information on the subject area. As described above, while the MF operation is performed, if no face is detected but if the head area is detected, the information on the head area is stored as the information on the subject area. Then, the process proceeds to step S510.

In step S506, it is determined whether or not the main subject candidate flag is set. Here, if the main subject candidate flag is set on a subject having the same detection ID as a subject in the previous frame, it is determined that the main subject candidate flag is set, and otherwise it is determined that the main subject candidate flag is not set. In a case where the main subject candidate flag is set, the process proceeds to step S505 and the position and size of the head area of the subject are stored as the information on the subject area. In this way, if the main subject candidate flag has been set as the face area of the same subject has been detected in the previous frame, or the head area is detected while the MF operation is performed, even if the face area is not detected in the current frame, the information on the head area is stored as the information on the subject area.

On the other hand, if the main subject candidate flag is not set, the process proceeds to step S512, and the main subject candidate flag is cleared, and then the process proceeds to step S517.

In step S510, the main subject candidate flag is set, and the process proceeds to step S513.

In step S513, it is determined whether or not the MF operation is currently performed, and if the MF is currently performed, the process proceeds to step S514, and if not, the process proceeds to step S516.

In step S514, the position in the focus detection frame of the subject currently under process to which the main subject candidate flag is set is specified. In this process, it is specified in which area or areas of the focus detection frame 408, arranged in a mesh pattern as shown in FIG. 4B, the center position of the subject currently under process is located. This is a process required to specify which of main subject candidates the user wishes to focus on while the MF operation is performed. After that, the process proceeds to step S515.

In step S515, focus detection is performed based on the AF signals from the area or areas in the focus detection frame 408 corresponding to the position specified in step S514, the focus detection result is stored, and the process proceeds to step S517.

On the other hand, in step S516, focus detection is performed based on the AF signals from the subject area located at the position and having the size stored in any of steps S502, S505, and S509, and the focus detection result is stored. Here, since the MF operation is not currently performed, the focus detection result corresponding to the focus detection frame set for each subject, such as the focus detection frames 405, 406, and 407 of FIG. 4A, is acquired. After that, the process proceeds to step S517.

In step S517, it is determined whether or not there is an unprocessed subject (detection ID), and if the process of setting the main subject candidate flag and the process of storing the focus detection result have been completed for all the detection results, the process ends. If there is an unprocessed subject (detection ID), the process returns to step S501 and the above-described process is repeated.

As described above, in the present embodiment, the determination on the result of head detection is changed depending on whether the MF operation is currently performed or not. That is, while the MF operation is performed, in order to detect the subject aimed at by the user, a flag is set as a candidate for the main subject even on a small face whose eyes and nose cannot be detected and a face that does not face forward. On the other hand, while the MF operation is not performed, a small face whose eyes and nose cannot be detected and a face that does not face forward are generally unlikely to be the main subject, so the flag is not set as not being a candidate for the main subject. However, if the face of the subject whose face had been detected is not detected and the head detection result is valid, the main subject candidate flag is continuously set on the subject. This makes it easier to capture the subject aimed at by the user while the MF operation is performed, and otherwise it is possible to perform focus adjustment control on the face that is likely to be of the main subject.

An example of setting the main subject candidate flag as described above will be described with reference to FIGS. 9C and 9D.

FIG. 9C shows a case where subjects 905 and 906 are included in the screen, while the MF operation is not performed. Since the face area of the subject 905 is detected, the main subject candidate flag is set. On the other hand, the subject 906 shows a case where the face area is not detected but the head area is detected. In this case, if the main subject candidate flag is not set on the subject 906 appeared in the immediately previous frame, the main subject candidate flag is also not set on the subject 906 in the current frame. This is because only the head area of the subject 906 has been detected, and there is a low possibility that a subject in the state where the face has not been detected in the past will be the main subject.

When the subject 905 is determined as the main subject in the process in step S208 or S210 based on the main subject candidate flag set in this way, a main subject frame 907 indicating the main subject is displayed around the subject 905 in step S211. On the other hand, no frame is displayed around the subject 906. Further, only the subject 905 is subjected to the focus detection process.

Figure 9D:
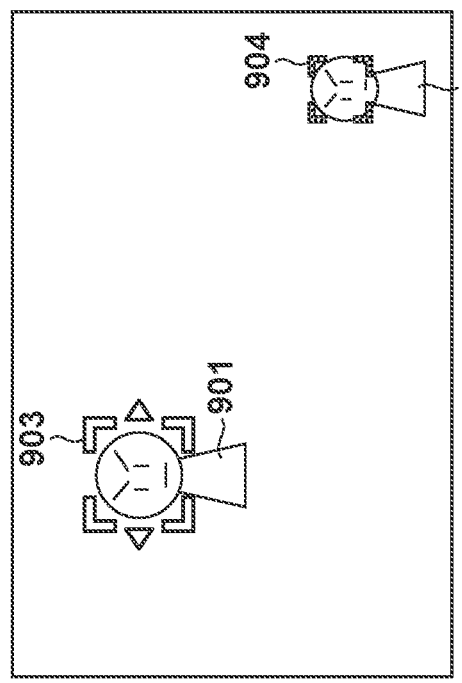

FIG. 9D shows the case where the same subjects 905 and 906 are included in the screen while the MF operation is performed. Since the face area of the subject 905 is detected, the main subject candidate flag is set on it. Further, although the face area of the subject 906 is not detected, since the head area is detected, the main subject candidate flag is set on the subject 906.

In a case where the subject 905 is determined as the main subject by the process in step S206 based on the main subject candidate flag set in this way, the main subject frame 907 indicating the main subject is displayed around the subject 905 in step S211. Further, a candidate frame 908 is displayed around the subject 906, and both the subjects 905 and 906 are subjected to the focus detection process.

If the user intentionally performs a focus operation on the subject 906 in this state, there is a possibility that the user wishes the subject 906 to be the main subject. Therefore, even if the face is not detected, if there is a head detection result, the candidate frame 908 is displayed and the subject 906 is subjected to the focus detection process. In this way, while the MF operation is performed, by subjecting a subject that is not a candidate for the main subject while the MF operation is not performed to the focus detection process, it becomes possible to reflect the user's intention when changing the main subject.

Figure 6:
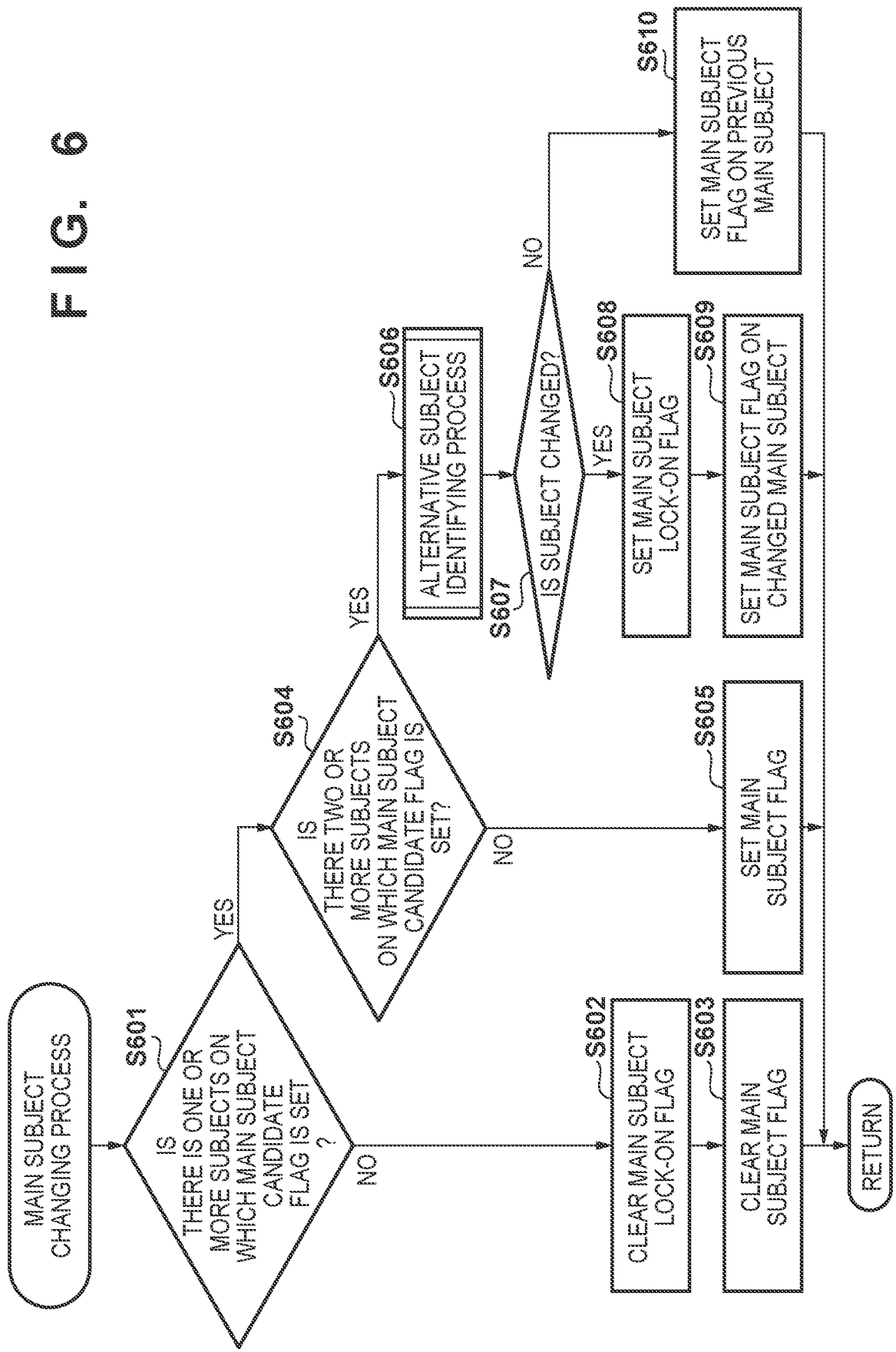
FIG. 6 is a flowchart of a main subject changing process according to the first embodiment.

Next, the main subject changing process performed in step S206 of FIG. 2B will be described with reference to FIG. 6. This process is executed while the MF operation is performed.

In step S601, it is determined whether or not there is one or more subjects on which the main subject candidate flag is set. If there is one or more subjects on which the main subject candidate flag is set, the process proceeds to S604, and if there is none, the process proceeds to step S602.

In step S602, a main subject lock-on flag is cleared for all of the detected subjects, and the process proceeds to step S603. In step S603, the main subject flag is cleared for all of the detected subjects, and the main subject changing process is terminated. In this case, neither the main subject frame nor the candidate frame is displayed in step S211.

On the other hand, in step S604, it is determined whether or not there are two or more subjects on which the main subject candidate flag is set. At least two subjects are required to change the main subject. Therefore, if there are two or more subjects, the process proceeds to step S606, and if not, the process proceeds to step S605.

In step S605, since there is only one subject on which the main subject candidate flag is set, the main subject flag is set on that subject, and the main subject changing process is terminated.

In step S606, an alternative subject identifying process for identifying the changing of the main subject is performed based on the operation information of the lens unit 10 and the focus detection result, and the process proceeds to step S607. The process of step S606 will be described later with reference to FIG. 7.

In step S607, it is determined whether or not the main subject is changed. If changed, the process proceeds to step S608, and if not, the process proceeds to step S610.

In step S608, the main subject lock-on flag is set on the changed subject specified in step S606, and further, in step S609, the main subject flag is set on the changed subject specified in step S606, and the main subject changing process is terminated.

In step S610, since the main subject is not changed, the main subject flag is set on the subject having the same detection ID as the main subject determined in the previous routine, and the main subject changing process is terminated.

As described above, in a case where the main subject is changed while the MF operation is performed, by setting the lock-on flag on the changed subject, it is possible to prevent the main subject from being changed when the AF frame is set after the MF operation is completed. This makes it possible to continuously focus on the subject intended by the user during the MF operation as the main subject.

Figure 7:
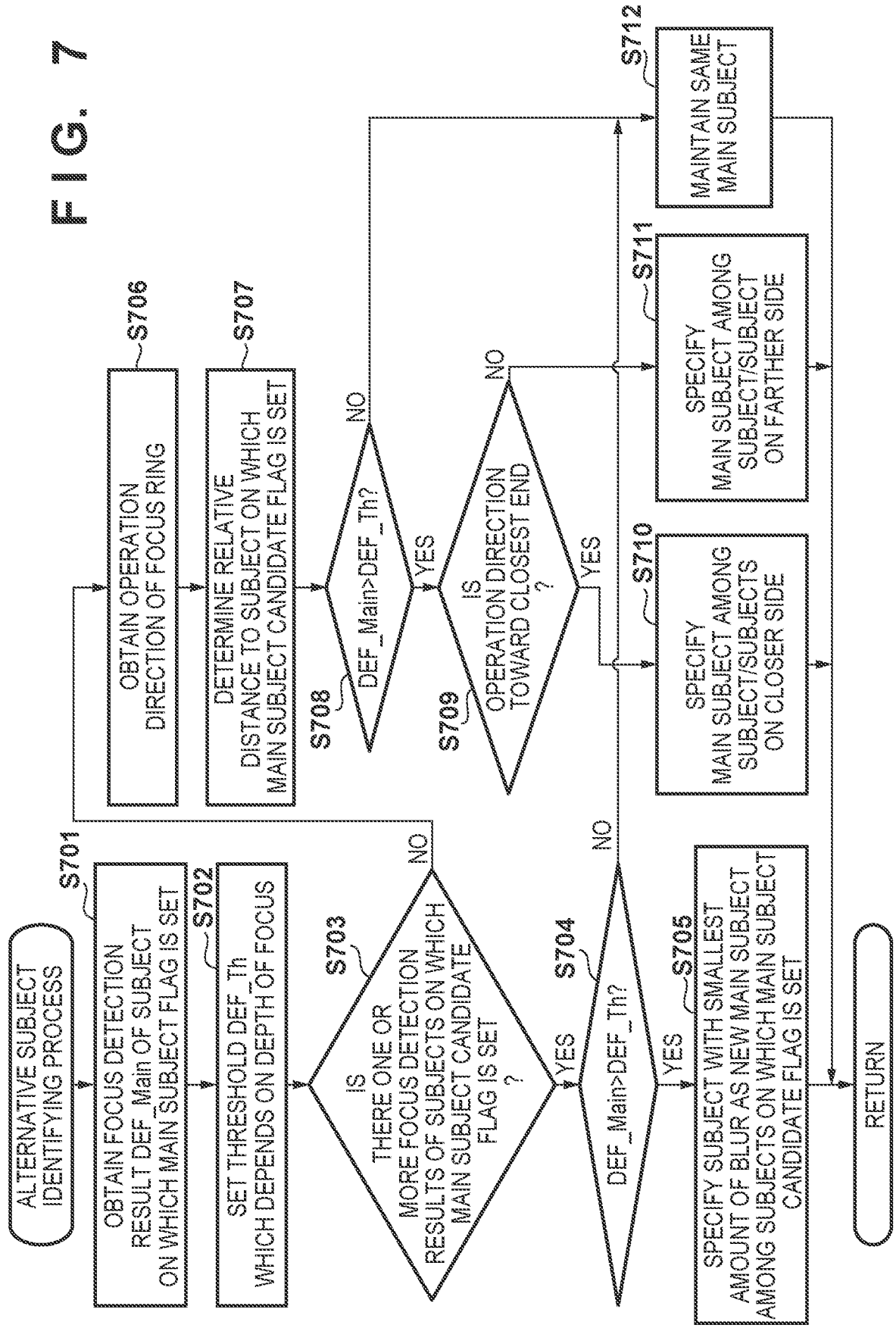
FIG. 7 is a flowchart of an alternative subject identifying process according to the first embodiment.

Next, the alternative subject identifying process performed in step S606 will be described with reference to FIG. 7.

First, in step S701, the focus detection result of the main subject on which main subject flag is set is acquired and held as DEF_Main, then the process proceeds to step S702.

In step S702, the depth of focus is calculated from the information obtained from the lens control unit 106, and N times the depth of focus is set as a changing threshold DEF_Th. This changing threshold DEF_Th is a threshold value for determining whether the user wants to change the subject when the amount of blur of the main subject becomes N times the depth of focus or more. Note that this threshold value is an example, and may be another value as long as it can detect the change of the main subject.

In step S703, it is determined that whether or not there is a focus detection result of another subject that can be a main subject by determining whether or not there is a focus detection result of a subject on which the main subject candidate flag is set but on which the main subject flag is not set. If there is a focus detection result, the process proceeds to step S704, and if there is no focus detection result, the process proceeds to step S706.

In step S704, the focus detection result DEF_Main of the main subject on which the main subject flag is set is compared with the changing threshold DEF_Th. If DEF_Main>DEF_Th, it is determined that the user has changed the main subject, and the process proceeds to step S705. If it is determined that the user has not changed the main subject, the process proceeds to step S712 where it is determined that the main subject is not changed, and the process ends.

In step S705, among the subject/subjects on which the main subject candidate flag is set, the subject with the smallest amount of blur is selected as a new main subject.

On the other hand, in step S706, the operation direction of the focus ring is acquired, the information about the moving direction (toward the closest or infinite end) of the focusing position of the focus lens 103 that can be acquired from the lens control unit 106 is acquired, and the process proceeds to step S707. In step S707, the relative distance from the camera system to each subject on which the main subject candidate flag is set is determined from the size of the subject. Here, from the size of the face, it is judged whether the subject is at a position closer to or farther from the camera system than the main subject. Basically, if the size of the subject is larger than the size of the main subject, the subject subject is determined on the closer side with respect to the main subject, and if the size is smaller, the subject is determined to be on the farther side with respect to the main subject. After that, the process proceeds to step S708.

In step S708, the focus detection result DEF_Main of the main subject on which the main subject flag is set is compared with the changing threshold DEF_Th. If DEF_Main>DEF_Th, it is determined that the user has changed the main subject, and the process proceeds to step S709. If it is determined that the user has not changed the main subject, the process proceeds to step S712 where it is determined that the main subject is not changed, and the process ends.

In step S709, it is determined whether or not the operation direction of the lens is toward the closest end. If the operation direction acquired in step S706 is toward the closest end, the process proceeds to step S710, and if not, the process proceeds to step S711.

In step S710, the main subject is specified from the subject/subjects on the closer side. This makes it possible to select the main subject from the subject or subjects whose sizes are small or for which the focus detection results could not be obtained due to the shooting conditions. One of the subject/subjects that exists/exist in the operating direction of the focus lens is selected and specified as the main subject. As a specifying method, as described above, a subject with a high possibility of being the main subject is selected based on the size and position of the face.

In step S711, the main subject is specified from the subject/subjects on the infinity side. Since the processing content is the same as that of step S710, the description is omitted. After that, the alternative subject identifying process is terminated.

As a result, the focus detection result of the subject is acquired during the MF operation, and the change of the focus detection result is monitored, so that the main subject can be automatically changed during the MF operation. Further, depending on the shooting conditions, there is a case where the focus detection result may not be obtained. Even in such a case, it is possible to determine the changing of the main subject based on the operating direction of the lens and the face size.

Here, the changing of the main subject when YES is determined in step S704 will be described with reference to FIGS. 10A to 10C.

Figure 10A:
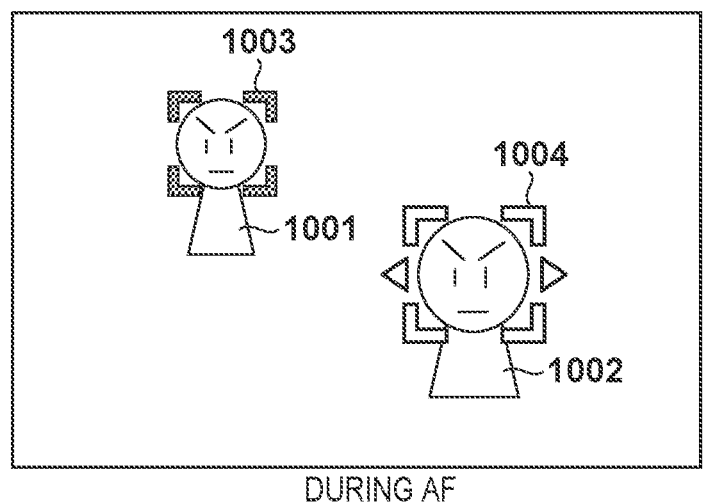
FIGS. 10A to 10C are conceptual diagrams showing examples of displayed frames showing a main subject and a main subject candidate while the MF operation is performed and while the MF operation is not performed according to the first embodiment.

FIG. 10A shows an example of a display state before the MF operation, and shows a case where there are two subjects, a first subject 1001 (out of focus) and a second subject 1002 (in focus). Here, since the main subject flag is set on the second subject 1002, in step S211 of FIG. 2B, a main subject frame 1004 indicating that the second subject 1002 is the main subject is displayed around the second subject 1002. On the other hand, since the main subject candidate flag is set on the first subject 1001, a candidate frame 1003 indicating that the first subject 1001 is a main subject candidate is displayed.

Figure 10B:
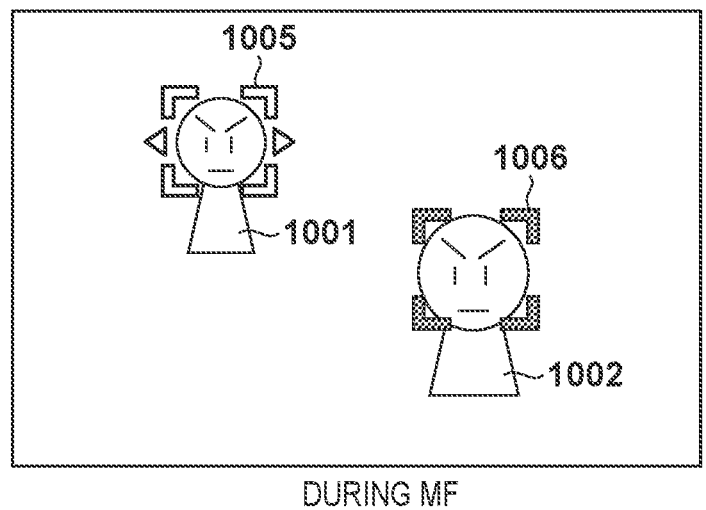

FIG. 10B shows a case where the focus lens 103 is driven in the direction toward a position at which the first subject 1001 will be in focus from the state in which the second subject 1002 is in focus by the MF operation. When the focus detection result DEF_Main of the second subject 1002 becomes larger than the changing threshold DEF_Th, the main subject flag is cleared. Therefore, in step S211, instead of the main subject frame 1004 indicating that the subject is the main subject, a candidate frame 1006 indicating that the subject is the main subject candidate is displayed. On the other hand, since the main subject flag is set on the first subject 1001, a main subject frame 1005 indicating that the first subject 1001 is the main subject is displayed.

Figure 10C:
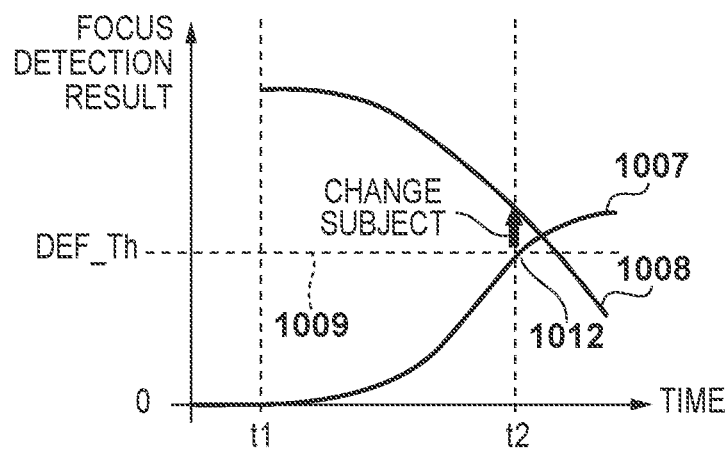

FIG. 10C is a diagram for explaining the above state in chronological order. In FIG. 10C, the vertical axis represents the focus detection result, and 0 represents an in-focus state. The horizontal axis represents time. Further, the focus detection result of the first subject 1001 is shown by a curve 1008, and the focus detection result of the second subject 1002 is shown by a curve 1007.

The state shown in FIG. 10A is a state based on the focus detection result at time t1, and by driving the focus lens 103 from that state, the focus detection result 1008 of the first subject 1001 decreases, while the focus detection result 1007 of the second subject 1002 increases. At a point 1012 (time t2) when the focus detection result 1007 exceeds the changing threshold DEF_Th, the camera determines that the user wants to focus on the first subject 1001, and changes the main subject (state shown in FIG. 10B).

In this way, by changing the main subject while driving the focus lens, it is possible to simplify the operation of the focus lens by the user. That is, by setting AF, if the user stops the operation of the focus ring after the main subject frame 1005 indicating the main subject is displayed, AF control is performed on that subject, so the continuous focus adjustment from the MF operation is possible.

Next, the main subject lock-on determination process performed in step S208 of FIG. 2A will be described with reference to FIG. 8.

In a case where a frame that indicates a face area of a person other than the main subject is displayed, if the frame is kept displayed around an unintended subject, the frame may be a disturbance. However, there are some scenes where it is better to follow the subject for a certain period of time depending on the shooting situation. For example, in a case where there are multiple people to be shot on the screen, if a subject/subjects other than the main subject is/are followed as a main subject candidate/candidates for a certain period of time, when the main subject disappears and cannot be followed, by changing the main subject to another subject, it is possible to prevent from focusing on or adjusting exposure on the background.

Therefore, in this process, while improving the tracking performance of the main subject in the situation where the main subject disappears, it is controlled to select an appropriate main subject according to the shooting situation.

First, in step S801, it is determined whether or not there is a subject, determined in step S204, on which the main subject candidate flag is set within a predetermined area from the position of the subject (for example, the touch position) designated by the subject designation instruction received from the camera operation unit 208 in step S207. The predetermined area described above may be the size of the face area or head area stored in the subject area of the subject information, or may be within a distance of, for example, twice the size of the face area or head area. If there is a main subject candidate within the predetermined area, the process proceeds to step S802, and if not, the process proceeds to step S809.

In step S802, it is determined whether or not there are a plurality of main subject candidates within the predetermined range of the touch position, and if it is determined that there is only one person, the process proceeds to step S803, and if it is determined that there are a plurality of persons, the process proceeds to step S804.

In step S803, it is determined whether or not the reliability of the face area or head area determined to be within a predetermined area from the touch position and stored in the subject area of the main subject candidate is equal to or higher than a predetermined threshold. If it is determined that the reliability is equal to or higher than the threshold, the process proceeds to step S805, and if it is determined to be less than the threshold, the process proceeds to step S806.

On the other hand, in step S804, it is determined whether or not the sizes of the face areas or head areas of all the main subject candidates determined to be within the predetermined area from the touch position are equal to or less than the threshold. If it is determined that the all sizes are equal to or less than the threshold, the process proceeds to step S807, and if it is determined that there is a subject having a size larger than the threshold, the process proceeds to step S808.

Next, in steps S805 and S808, the main subject candidate within the area from the touch position and closest to the touch position is locked-on.

On the other hand, in steps S806, S807, and S809, the features of a subject is extracted based on the touch position to track an object other than the face or head of a person (hereinafter, referred to as "object tracking").

Next, in step S810, the locked-on main subject candidate is determined as the main subject, and the main subject candidate flag is set on the locked-on main subject. Then, in step S811, the main subject candidate flag set on the subject/subjects other than the locked-on main subject is cleared so that the subject other than the locked-on main subject does not become the main subject candidate, then the process is terminated.

The reason for performing object tracking in step S806 when it is determined in step S803 that the reliability is less than the threshold is that the reliability of head detection is low, for example, when a part of the head is out of frame. In such a case, the detected position and size become unstable, and AF may become unstable. Therefore, if the reliability of the detected face area or head area is low, an area is specified by tracking using the color information and brightness information at the time of touch, and the subject at the position specified by the user is temporarily tracked as an object. Then, by changing the tracking target to a face or head when a face or a highly reliable head is detected nearby during tracking, it is possible to reduce a situation in which the AF becomes unstable.

Further, the reason for performing object tracking in a case where it is determined in step S804 that there are a plurality of faces and heads as detection results within a predetermined area from the touch position, is that there is a possibility that an unintended person will be tracked among those people due to the deviation of the touch position or the like specified by the user. Therefore, the subject at the position specified by the user is temporarily tracked as an object, and then, when a face or head of a predetermined size or larger is detected within the predetermined area, the tracking target is changed to the face or head. In this way, it is possible to reduce the cases of focusing on an unintended person.

The above-described process will be explained with reference to FIGS. 11A to 11I.

FIG. 11A shows a scene in which one person 1101 enters a screen with facing backwards when the MF operation is not performed. In this case, since the main subject candidate flag is cleared for the person 1101 in step S512 of FIG. 5B, no frame is displayed.

FIG. 11B shows a case where the same person 1101 faces the front, changed from the state shown in FIG. 11A. In this case, since the main subject candidate flag is set in step S510 of FIG. 5B and there is only one main subject candidate, the person 1101 is automatically selected as the main subject in step S605 of FIG. 6 and a main subject frame 1102 is displayed.

FIG. 11C shows a case where the person 1101 faces backwards, changed from the state in which the person 1101 faces the front shown in FIG. 11B. In this case, since the person 1101 has faced the front once, the main subject candidate flag has been set and the head area has been detected, so that the main subject candidate flag is set in step S510 of FIG. 5B. Further, in step S605 of FIG. 6, the person 1101 is automatically selected as the main subject, so the main subject frame 1102 continues to be displayed. By keeping the person 1101 as the main subject candidate, it is possible to continue focusing on the person 1101 and prevent from focusing on or adjusting brightness on an unintended area.

FIG. 11D shows a scene in which there are a plurality of people (person 1103 and person 1105) when the MF operation is not performed. In this case, the main subject candidate flag is set on the person 1103 facing the front in step S510 of FIG. 5B, and since there is only one main subject candidate, the person 1103 is automatically selected as the main subject in step S605 of FIG. 6, and a main subject frame 1104 is displayed. On the other hand, since the person 1105 is facing backwards, the main subject candidate flag is cleared in step S512, and no frame is displayed.

FIG. 11E is a case where the person 1105 faces the front, changed from the state shown in FIG. 11D. In this case, the face area of the person 1105 is detected, the main subject candidate flag is set in step S510 of FIG. 5B, and a candidate frame 1106 is displayed. In this case, the person 1105 can also be the main subject, but if there is no instruction to change the main subject by MF operation (step S206), by subject designation instruction (step S208), or by automatic judgment (step S210), the present person 1103 who has already been selected as the main subject continues to be the main subject for the time being.

FIG. 11F shows a case where the person 1105 faces backwards, changed from the state in which the person 1105 faces the front as shown in FIG. 11E. In this case, since the person 1105 has faced the front once, the main subject candidate flag has been set, and the head area has been detected, the main subject candidate flag is continuously set in step S510 of FIG. 5B. By continuously setting the person 1105 as the main subject candidate in this way, the person 1105 can be immediately set as the main subject when the person 1103 is framed out.

FIGS. 11G to 11I show a case where there are a plurality of people (person 1103 and person 1105), and the user designates the person 1105 by touching the person 1105 in the states shown in FIGS. 11D to 11F, respectively.

In the case of FIG. 11G, since the person 1105 is not detected as a subject, the person 1103 closest to the touch position is continuously selected as the main subject, and the main subject frame 1104 is continuously displayed.

Further, in the cases of FIGS. 11H and 11I, if the reliability of the face area or the head area is high, the person 1105 is locked-on as the main subject area by the processing of steps S801, S802, S803, S805, S810, and S811, and the person 1105 is selected as the main subject. In addition, a main subject frame 1109 is displayed. Further, since the subject candidate flag set on the person 1103 is cleared in step S811, the main subject frame 1104 displayed around the person 1103 is deleted.

As described above, when a person facing backwards is touched, if there is a head detection result at the touched position, the subject is locked-on using the head detection result regardless of whether it is already set as the main subject candidate area or not. If the user touches a person who is not yet set as the main subject area and main subject candidate area, and if there is a head detection result at the position specified by the touch, by locking-on the area specified by the head detection result as the main subject area using the head detection result, it will become possible to perform tracking on the main subject regardless of changes in the shape and brightness the subject.

As described above, according to the first embodiment, it is possible to change the subject to be focused on before driving the lens to the in-focus position. Furthermore, when AF is set, a highly versatile AF is realized by selecting a representative subject as the main subject. In addition, by changing the selection method of the main subject triggered by the MF operation, the subject aimed at by the user can be selected as the main subject, which enables performance of AF according to the user's purpose. Then, it is possible to continuously focus on the subject selected by the MF operation as an AF target even after the MF operation. Further, it becomes possible to easily change the main subject.

Further, the focus detection device according to the first embodiment can keep focusing on a subject in a wide area by changing focus detection area used for focusing operation according to the position of the subject in an area of a preset AF frame. Further, when it focuses on a subject other than the main subject, such as background (hereinafter referred to as "miscellaneous subject"), the present invention can prevent it from being difficult to focus on a new main subject appearing on the closest side.

Second Embodiment

Next, a second embodiment of the present invention will be described.

The method described in the first embodiment for determining the main subject is very useful in a case where, for example, the operator has determined a person to be shot and wishes to continuously focus on or adjust exposure on the person even when the face of the person cannot be seen. However, when shooting is performed basically on a person as the main subject, if the user wishes to focus on and adjust exposure on subjects other than a person or landscapes without changing the shooting mode, tracking a person even if the face cannot be seen disables to focus on and adjust exposure on subjects other than a person or on landscape as long as there is a person on the screen.

In addition, when a subject was excluded from the main subject candidates immediately after the face was disappeared, there were the following problems. That is, if an unintended person other than the person who the operator is trying to shoot enters the screen and then stays on the screen, the unintended person will not be excluded from the main subject candidates for a long time, and the unintended person may be selected as the main subject, and the focus state and exposure may change.

Therefore, in the first embodiment described above, even if the face of a subject cannot be detected, but if the head area can be detected, the subject is kept tracked as the main subject candidate, and the main subject is determined according to the designated method, and the focus adjustment and the exposure adjustment are performed. In situations where the face temporarily disappears as the main subject faces backwards when the main target of shooting is a person, it will be desired to keep the main subject as the main subject candidate as long as possible. However, in situations where the main target of shooting is not limited to a person or where a plurality of people are to be shot, sometimes the operator may wish to keep the main subject as the main subject candidate and other times the operator may not wish to keep the main subject as the main subject candidate depending on the shooting situation.

Accordingly, in the second embodiment, in addition to the first embodiment, the time to keep a subject as the main subject candidate is set for each main subject candidate, and the time is changed according to the situation of the subject including the main subject. Hereinafter, the processing performed in the second embodiment will be described with reference to FIGS. 12 to 16F. Since the digital video camera system shown in FIG. 1 is also used in the second embodiment, the description thereof will be omitted.

Figure 5A:
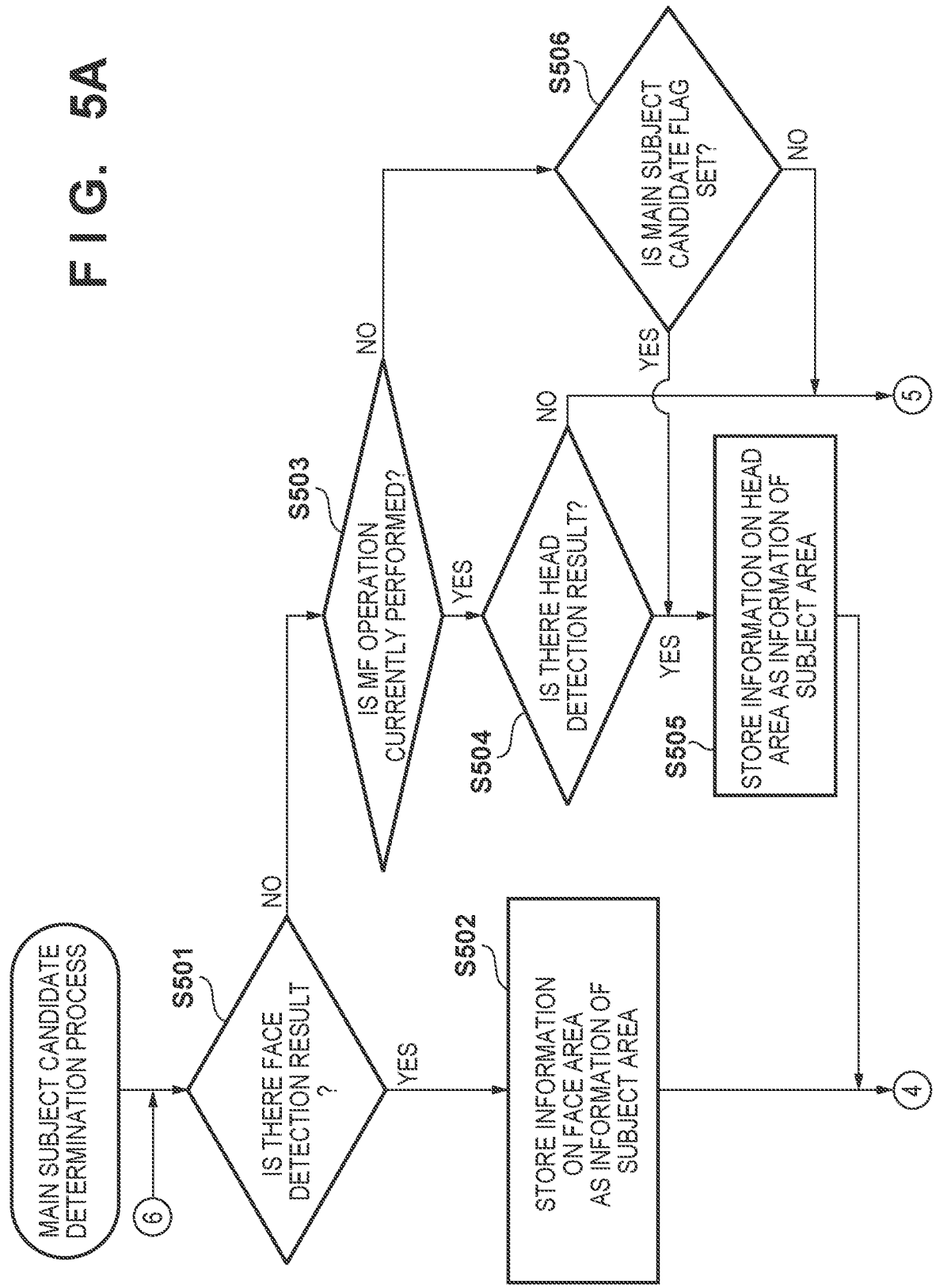
FIGS. 5A and 5B show a flowchart of a main subject candidate determination process according to the first embodiment.
Figure 5B:
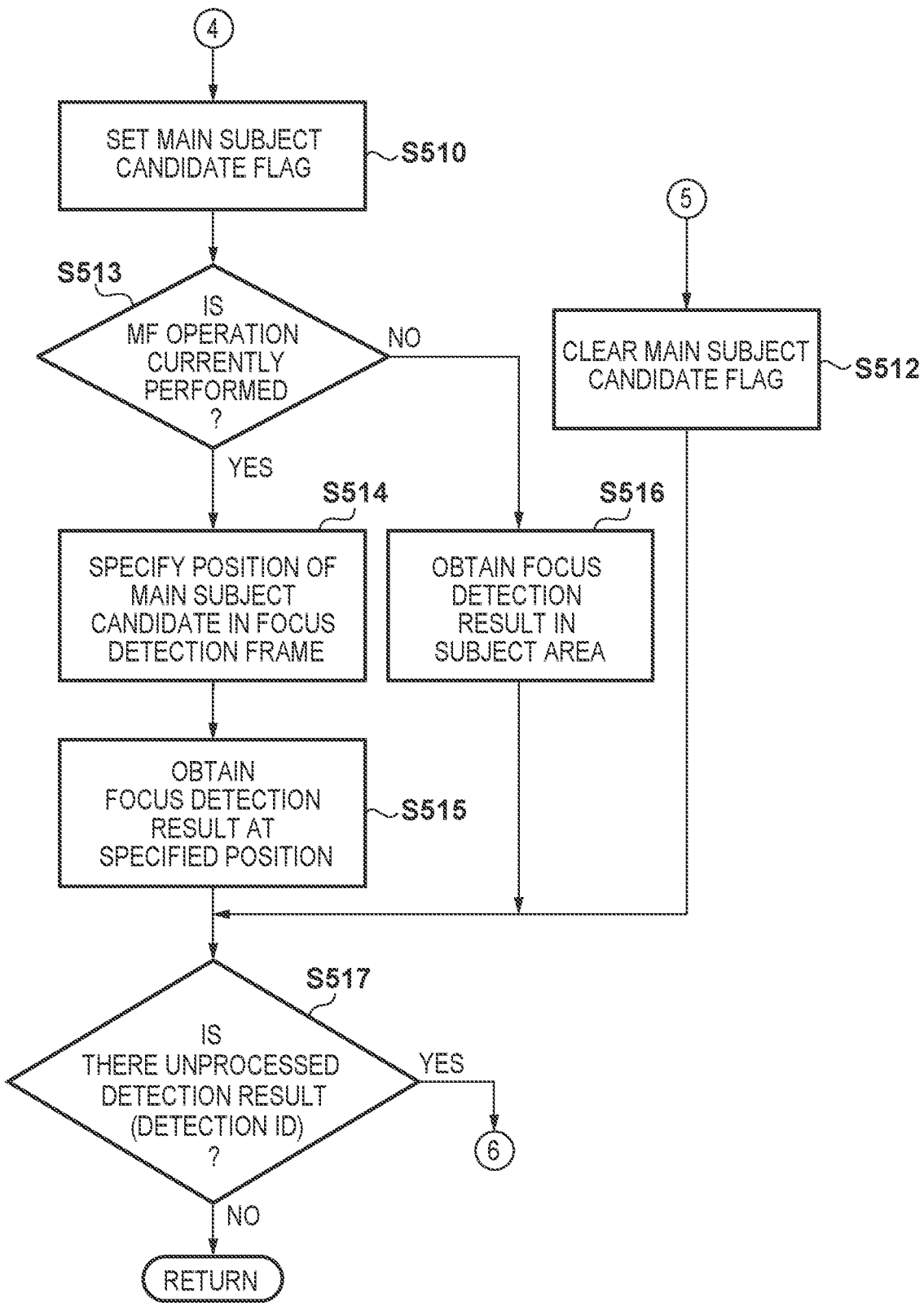
Figure 12A:
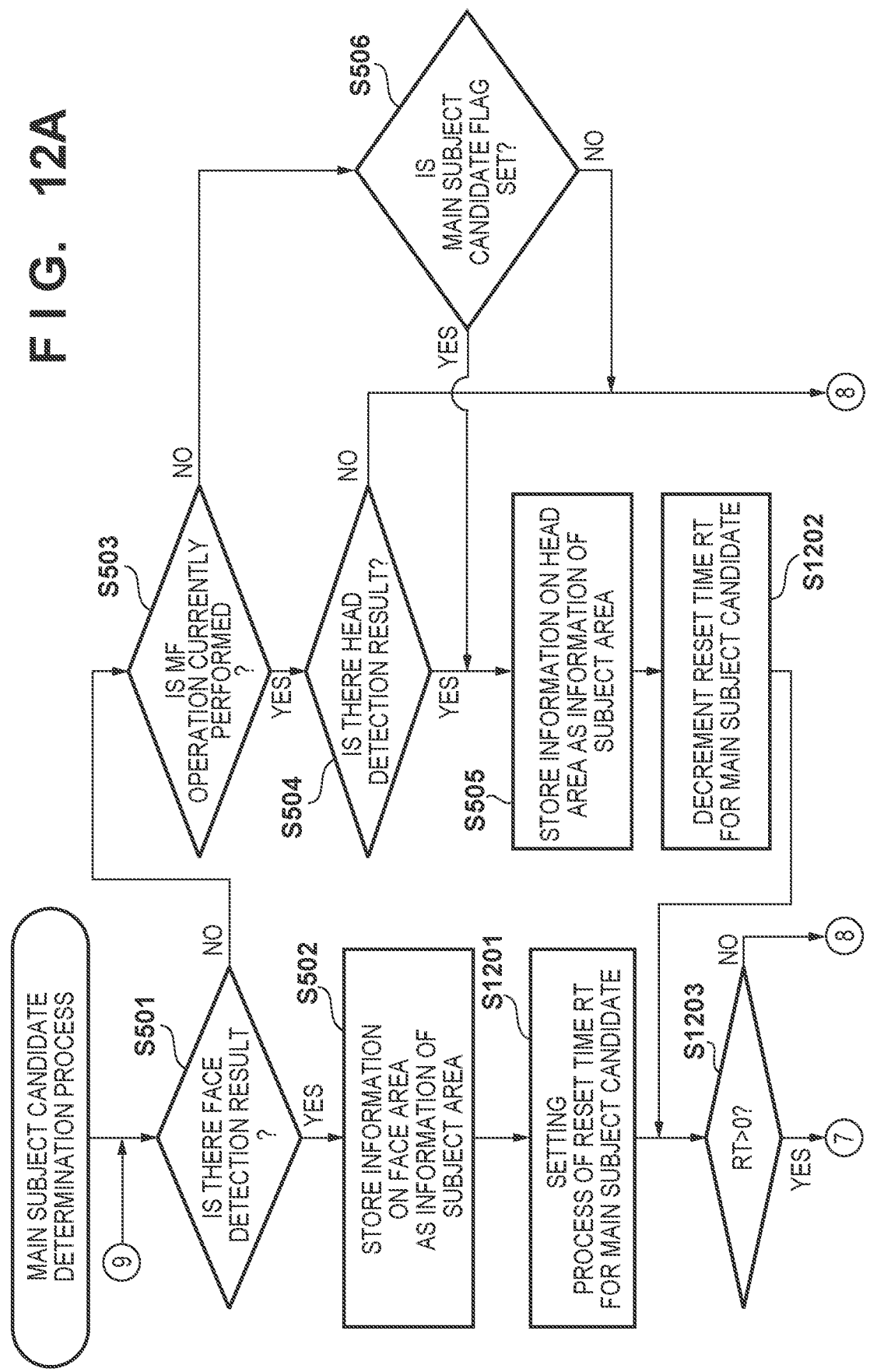
FIGS. 12A and 12B show a flowchart of a main subject candidate determination process according to a second embodiment.
Figure 12B:
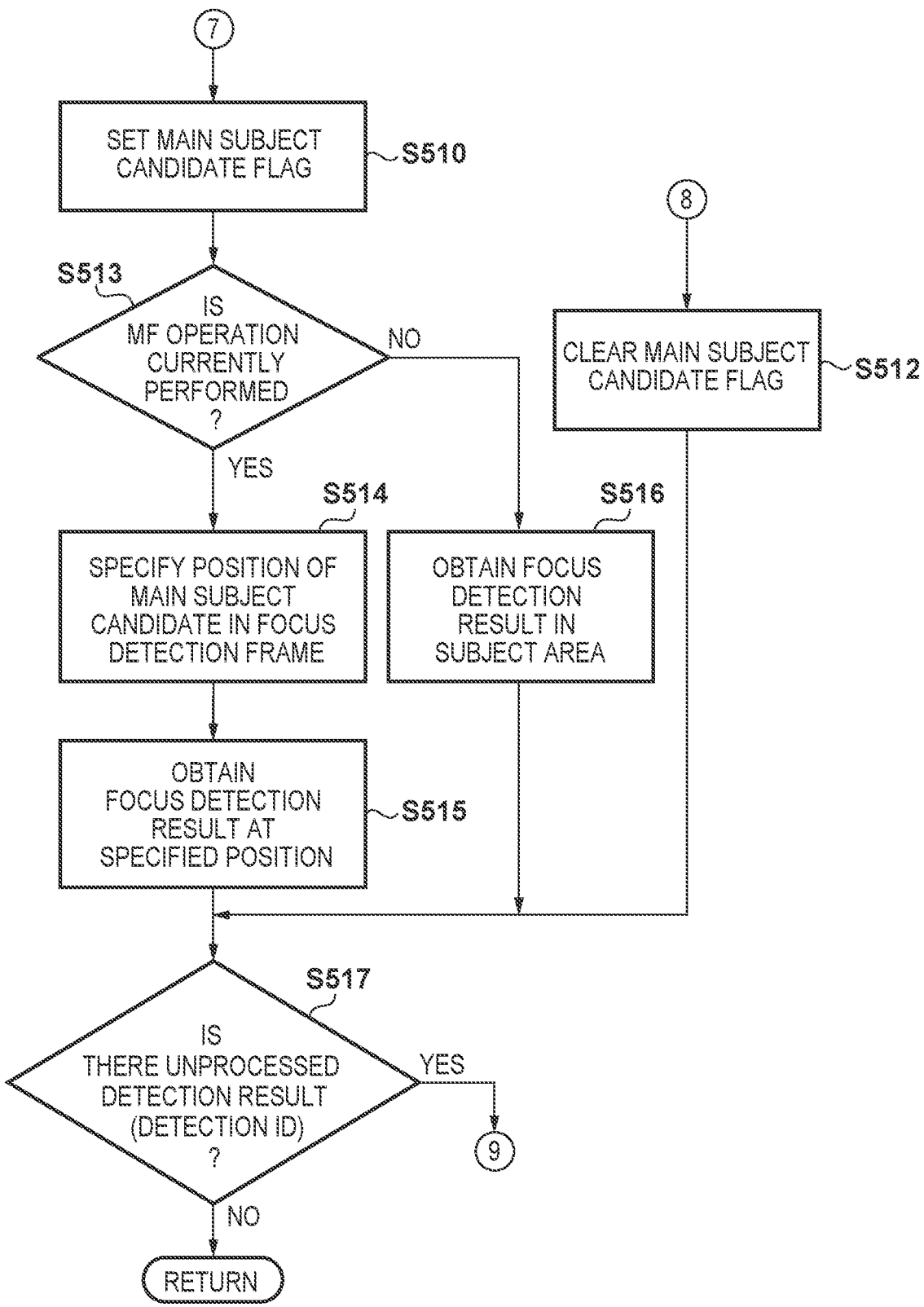

FIGS. 12A and 12B show a flowchart showing a main subject candidate determination process in the second embodiment, which is performed instead of the process shown in FIGS. 5A and 5B. In this process, processes in steps S1201 to S1203 for setting the time since detection of a face area which has been detected is failed until a main subject candidate flag is to be cleared for each subject, which is a feature of the second embodiment, are added to the main subject candidate determination process in the first embodiment described above with reference to FIGS. 5A and 5B. Since the other processes are the same as those shown in FIGS. 5A and 5B, the same step numbers are assigned and the description thereof is omitted.

In step S1201, a reset time RT (>0) from when detection of a face which has been detected is failed until the main subject candidate flag is to be turned off is set. The reset time RT shall be set for each subject according to preset conditions, and the details will be described later with reference to FIG. 13.

In step S1202, if the detection of the face area is failed, the reset time RT set in step S1201 is decremented. In step S1203, the main subject candidate reset determination unit 222 determines whether or not the reset time RT is greater than 0, and if yes, the main subject candidate determination unit 220 sets the main subject candidate flag in step S511. On the other hand, if the reset time RT is 0 or less, it is assumed that the time until the main subject candidate flag set in step S1201 is to be cleared has passed, and the main subject candidate flag is cleared in step S512.

With the processes of steps S1201 to S1203, the reset time RT according to the conditions is always set while the face is detected, and if the situation where the detection of the face is failed continues for the reset time RT, the face can be excluded from the main subject candidates. This is because there are many situations and scenes in which a person whose face cannot be seen for a long time is not suitable for focus adjustment control or exposure control, that is, not suitable as the main subject in general moving image shooting, and it is considered better to exclude it from the main subject candidates after a certain period of time has elapsed. However, if there is only one person to shoot, or if there are a plurality of people near the center of the screen, the operator may want to continue selecting the person/people as the main subject even if the face/faces cannot been seen. Therefore, the reset time RT is adjusted according to the situation.

Figure 13:
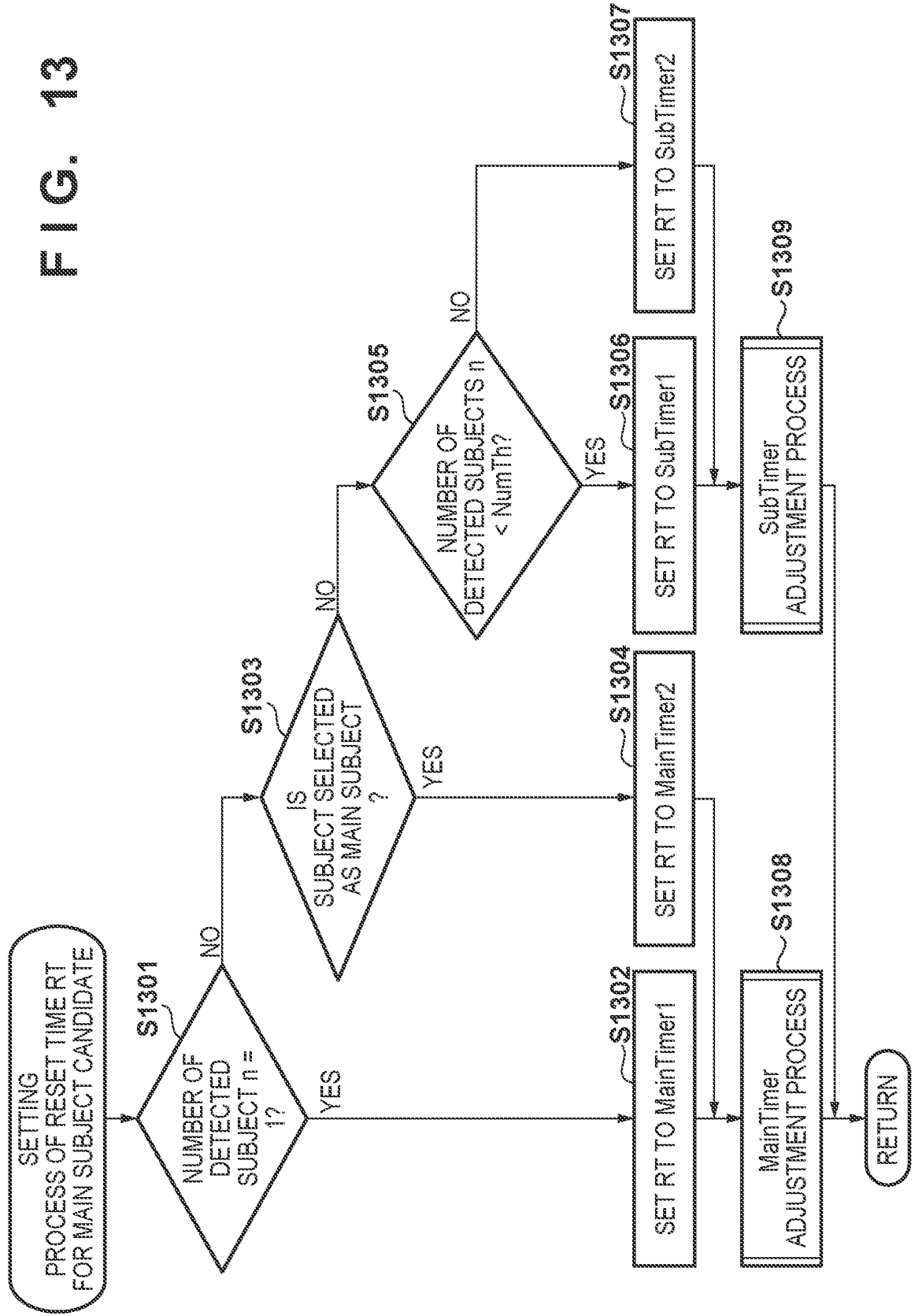
FIG. 13 is a flowchart showing a main subject candidate reset time setting process according to the second embodiment.

FIG. 13 is a flowchart showing details of the setting process of the reset time RT for a main subject candidate performed in step S1201 of FIG. 12A. In step S1301, it is determined whether or not the number n of the detected subjects is 1, and if it is 1, the process proceeds to step S1302, and if it is more than 1, the process proceeds to step S1303. In step S1302, the value of MainTimer1 is set as the reset time RT. Here, since the value of MainTimer1 represents a time for the situation where only the main subject is in the shooting screen, it is preferable to set MainTimer1 to a relatively long time, and in the present embodiment, it is set to 10 seconds as an example.

In step S1303, it is determined whether or not the subject being processed is selected as the main subject in the main subject determination process among the plurality of detected subjects, and if it is selected as the main subject, the process proceeds to step S1304, and if not, the process proceeds to step S1305. In step S1304, the value of MainTimer2 is set as the reset time RT. Here, the value of MainTimer2 represents a time to continue setting the subject being processed as the main subject in the situation where a plurality of people exist in the shooting screen. Therefore, comparing to a case where only one person exists in the shooting screen, there is a possibility that another main subject candidate may be selected as the main subject, and thus a shorter time or the same time as in a case where only one person exists in the shooting screen may be set. In this embodiment, as an example, it is assumed that MainTimer2 is set to 10 seconds similarly to MainTimer1.

In step S1305, it is determined whether or not the number n of the detected subjects is less than a threshold NumTh, and if the number n is less than the threshold NumTh, the process proceeds to step S1306, and if it is the same or more, the process proceeds to step S1307. In steps S1306 and S1307, the time for following the main subject candidate is set, and it is set shorter than MainTimer1 and MainTimer2, the time for following the main subject. This is because the main subject candidate is less likely to be a target to be shot than the main subject, and it is possible to prevent the main subject from being changed unintentionally by not setting the subject as the main subject candidate for a long time. In step S1306, the value of SubTimer1 is set as the reset time RT. Here, the value of SubTimer1 represents a time to keep the main subject candidate when the number of people is relatively small, and in the present embodiment, it will be described that the reset time RT is set to 3 seconds as an example.

On the other hand, in step S1307, the value of SubTimer2 is set as the reset time RT. Here, the value of SubTimer2 represents a time to keep the main subject candidate when there are many people in the shooting screen, and it is highly possible that subjects not intended by the user are in the screen, so the time shorter than SubTimer1 is set. In the present embodiment, as an example, it will be described that the reset time RT is set to 1 second.

In step S1308, a process of further adjusting, e.g., lengthening or shortening, the time for keeping a subject as the main subject set in step S1302 or S1304 is performed according to the conditions. In step S1309, similarly to step S1308, a process of adjusting the time for keeping a subject as the main subject candidate set in step S1306 or S1307 is performed according to the conditions. After finishing step S1308 or S1309, the process returns to the process of FIG. 12A.

Next, the details of the process in step S1308 will be described with reference to FIG. 14.

Figure 14:
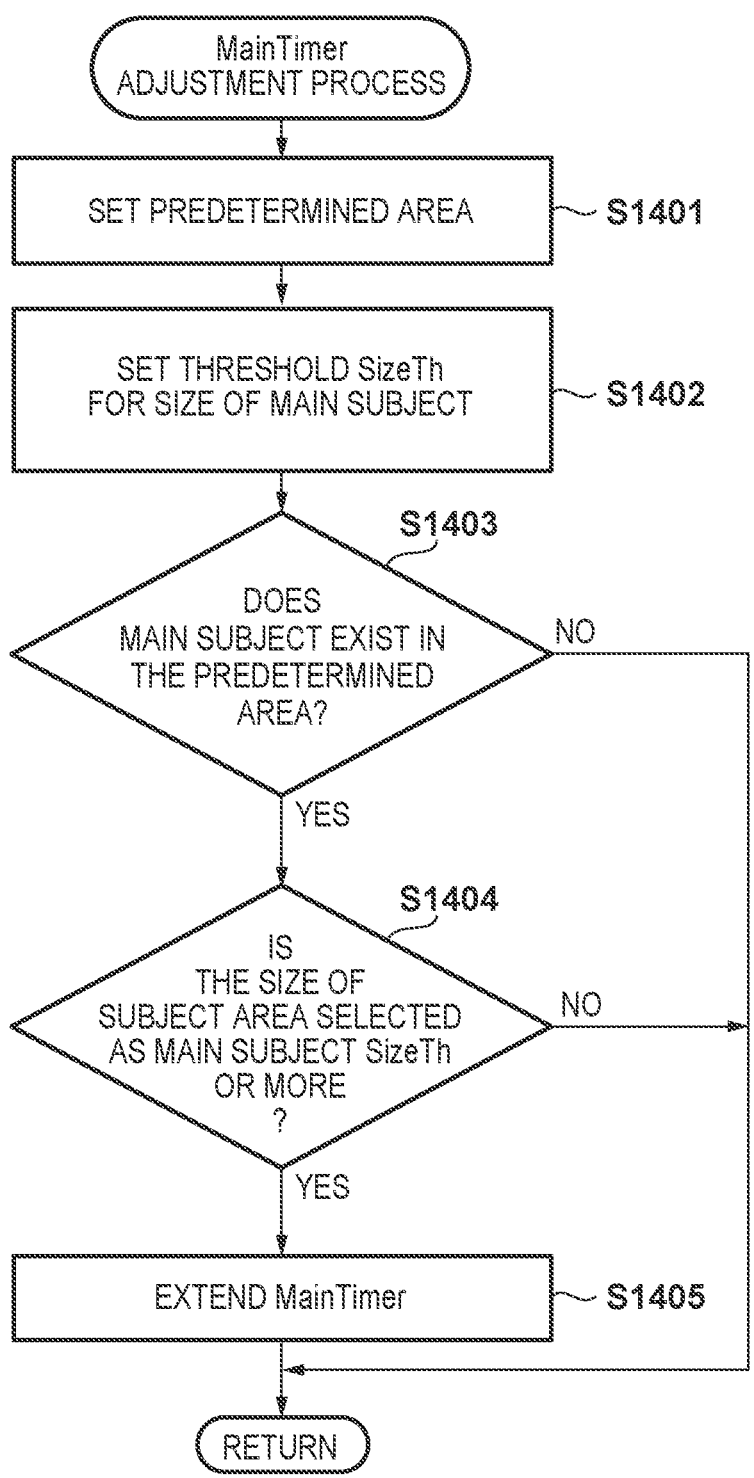
FIG. 14 is a flowchart showing a reset time adjustment process for a main subject according to the second embodiment.

FIG. 14 is a flowchart showing a process of adjusting the time for tracking the main subject according to the conditions. In step S1401, an area used for determining whether or not the main subject is in a predetermined area on the screen performed in step S1403 described later, is set. The concept of the predetermined area will be described later with reference to FIGS. 16A to 16F.

In step S1402, a threshold SizeTh for the size used for determining whether or not the sizes of the face area and head area of the main subject are large to some extent in step S1404, is set. This is because when a person is shot as the main subject, the shot face tends to be large to some extent, and it is highly likely that the small face is not of the person intended by the user, that is, of the main subject.

In step S1403, it is determined whether or not the main subject exists in the predetermined area set in step S1401. If it is determined that the main subject exists, the process proceeds to step S1404, and if it is determined that the main subject does not exist, the process ends.

In step S1404, it is determined whether or not the sizes of the face area and the head area are larger than the threshold SizeTh for the size set in step S1402.

In step S1405, the reset time RT, set in steps S1302 and S1304 of FIG. 13, representing a time before tracking operation on the main subject is stopped is set to a time longer than that of MainTimer1 and MainTimer2, and the process ends.

Figure 16A:
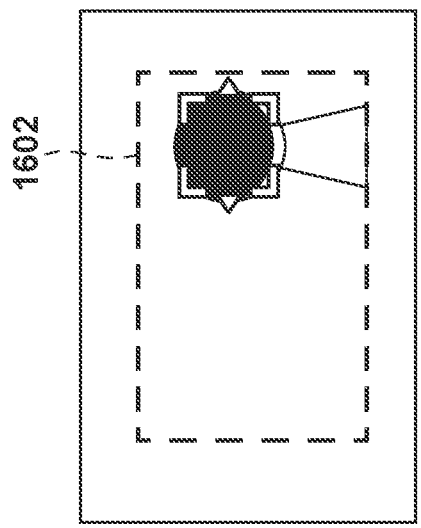
FIGS. 16A to 16F are conceptual diagrams showing areas for adjusting a reset time for a main subject and a reset time for a main subject candidate, and distances between subjects according to the second embodiment.
Figure 16D:
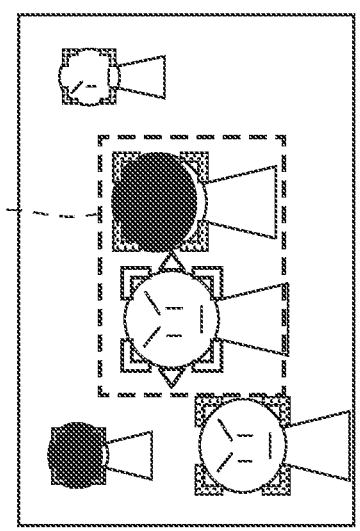
Figure 16B:
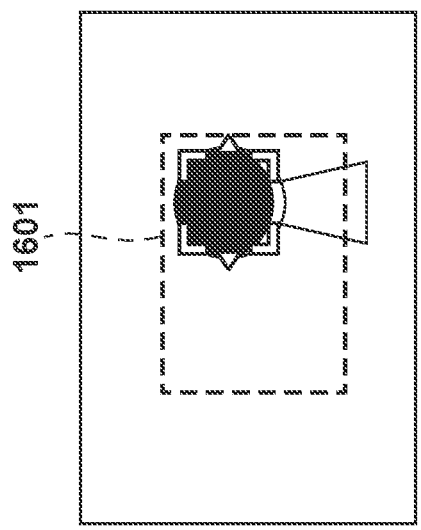
Figure 16E:
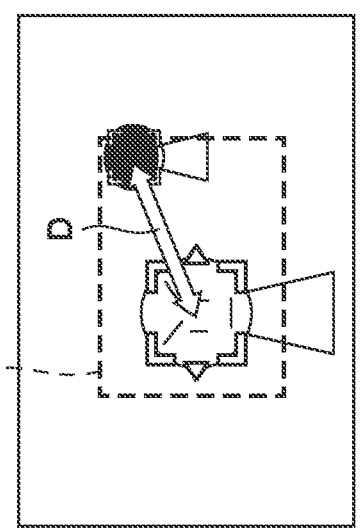
Figure 16C:
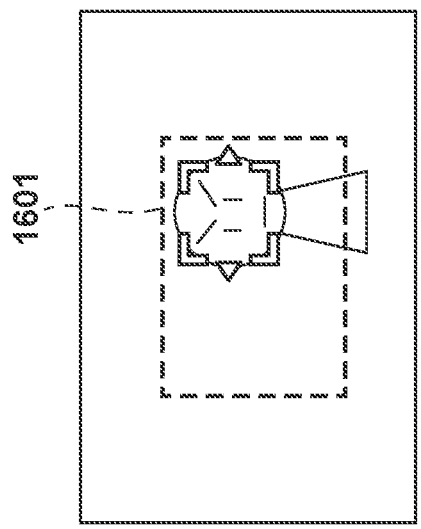
Figure 16F:
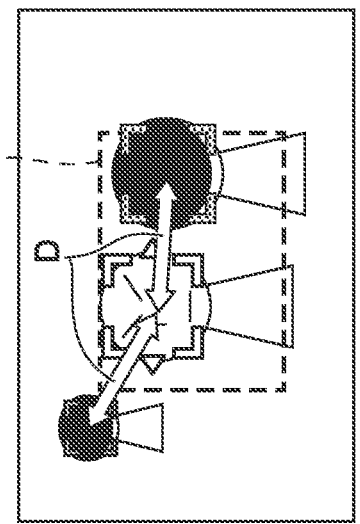

Here, the predetermined area will be described with reference to FIGS. 16A to 16F. FIGS. 16A to 16F are schematic views showing a scene in which a person is a subject in the shooting screen. FIGS. 16A to 16C show a case where there is only one subject, that is, only the main subject is shot, and the face of the main subject disappears as time elapses. FIGS. 16D to 16F show cases where there are a plurality of subjects.

When shooting a moving image with a person as the main subject, the subject is generally framed near the center of the screen. Therefore, if the subject is detected near the center of the screen, it is highly likely that the subject is the person that the user intends to shot. Therefore, it is determined whether or not there is a face area and a head area of the detected subject in an area 1601 shown by a broken line in FIGS. 16A to 16F, and if there is any, the face area is continuously tracked for a longer time after the face has disappeared. That is, the reset time RT, set in steps S1302 and S1304 of FIG. 13, representing a time before tracking operation on the main subject is stopped is reset to a time longer than that of MainTimer1 and MainTimer2.

In the present embodiment, 15 seconds will be set as an example, but the present invention is not limited to this, and may be set to, for example, 30 seconds or infinity (tracking is continued until both detection and tracking become impossible). Alternatively, MainTimer1 and MainTimer2 may be maintained. Note that FIG. 16A shows a case where the face area can be seen, and FIG. 16B shows a case where the main subject faces backwards and the face area cannot be seen. Since, the face area is within the area 1601 in both cases, the reset time RT until the subject tracking is reset is 15 seconds. However, if the subject is near the boundary of the area 1601 and frequently enters and exits the area 1601, the reset time RT may be set to 10 seconds sometimes, and set to 15 seconds at other times, which makes the rest time RT unstable. Accordingly, once the main subject enters the area 1601, the area 1601 may be expanded to an area 1602 as shown in FIG. 16C, and the reset time RT may be maintained until the main subject goes out of the area 1602. By doing so, it is possible to prevent the reset time RT from becoming unstable then the subject exists near the boundary of the area.

Further, in the process shown in FIG. 14, the conditions for extending the MainTimer has been described, but if the conditions imply that it is better not to track the main subject for a long time, the reset time before the tracking of the main subject is stopped may be shortened. For example, if the panning of the camera is detected, it may be determined that it is intended to change the main subject, and the reset time may be shortened so as to stop tracking the subject whose face cannot be seen as the main subject.

Further, in the present embodiment, a rectangular area having a predetermined size and centered on the center of the screen is set as the area 1601, but considering that there is a high possibility that the main subject exists in the area at the upper part of the screen, the center position of the area 1601 may be shifted upward or expanded upward. Further, the area may be changed according to the orientation of the camera. Further, in the present embodiment, the reset time RT is adjusted depending on whether or not the subject is in the area, but the present invention is not limited to this, and the reset time RT may be changed according to the image height.

Next, the details of the process in step S1309 will be described with reference to FIG. 15

Figure 15:
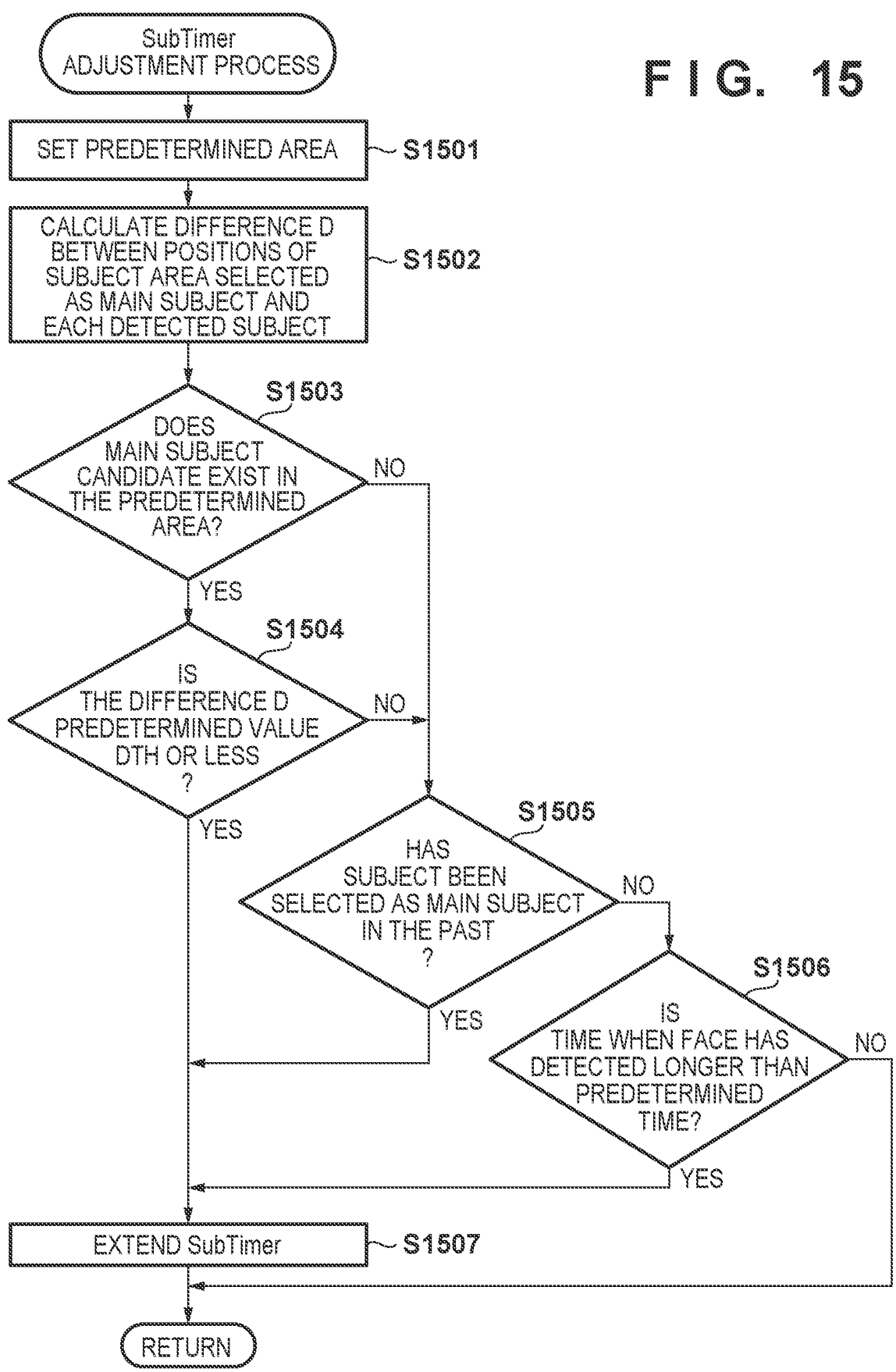
FIG. 15 is a flowchart showing a reset time adjustment process for a main subject candidate according to the second embodiment.

FIG. 15 is a flowchart showing a process of adjusting the time for tracking the main subject candidate according to the conditions. In step S1501, an area used for determining whether or not the main subject candidate is in a predetermined area on the screen performed in step S1503 described later, is set. In the present embodiment, this area will be described as the same area as the area 1601 for the main subject of FIGS. 16A to 16C, but it may be set smaller or larger than the area 1601.

In step S1502, the difference D between the detected positions of the subject area selected as the main subject and each main subject candidate is calculated. Here, in order to determine whether each detected subject is close to the main object or not in step S1504, the distances between the center positions of the face areas and the head areas on the screen between the main subject and each main subject candidate are calculated as shown in FIGS. 16D and 16E.

In step S1503, it is determined whether or not the main subject candidate exists in the predetermined area set in step S1501, if it is determined that the main subject candidate exists, the process proceeds to step S1504, and if it is determined that the main subject candidate does not exist, the process proceeds to step S1505.

In step S1504, it is determined whether or not the difference D between the detected positions of the main subject and each main subject candidate calculated in step S1502 is equal to or less than a predetermined value DTh. If it is equal to or less than the value DTh, it is determined that the distance between the main subject and the main subject candidate is short, and the process proceeds to step S1507. On the other hand, if the difference D is greater than the value DTh, it is determined that the distance between the main subject and the main subject candidate is long, and the process proceeds to step S1505. The predetermined value DTh may be a predetermined fixed value, or may be calculated based on the sizes of the face area and the head area.

In step S1507, the reset time RT, set in steps S1306 and S1307 of FIG. 13, representing a time before tracking operation of the main subject candidate is stopped is set to a time longer than that of SubTimer1 and SubTimer2, and the process ends.

As described above, if the subject is detected near the center of the screen, it is highly likely that the subject is the person the user intends to shoot. Also, if the subject is a main subject candidate that exists near the main subject, when the main subject is lost, it is highly likely that the subject will be a candidate for the next main subject. Therefore, it is considered that a subject that meets these conditions should be tracked for a longer period of time even if the face disappears. In the present embodiment, 5 seconds will be set as an example, but the time is not limited to this, and SubTimer1 and SubTimer2 may be maintained.

Note that FIG. 16D shows a case where there are one subject whose face area cannot be seen near the main subject whose face area can be seen in the area 1601 and one subject whose face area cannot be seen outside the area 1601. Further, FIG. 16E shows a case where there is one subject whose face area cannot be seen in the area 1601, and is away from the main subject. In the case of FIG. 16D, since the subject whose face area cannot be seen is within the predetermined area 1601 and near the main subject, the reset time RT until the subject tracking is stopped is changed to 5 seconds, but in the case of FIG. 16E, since the subject whose face area cannot be seen is far from the main subject, the reset time RT until the subject tracking is stopped is not extended and remains as 3 seconds.

Further, FIG. 16F shows a scene in which many people are on the screen. When there are many subjects, since the main subject may be easily changed against the user's intention, it is better not to track the main subject candidates too long. This corresponds to the case where the number of detected subjects is larger than the predetermined number NumTh in step S1305 of FIG. 13 and a short time is set in step S1307.

In step S1505, it is determined whether or not the subject has been selected as the main subject in the past, and if it has been selected, there is a high possibility that the user intends to shoot the subject, so the process proceeds to step S1507 and the time before the subject tracking is stopped is adjusted, and if it has never been selected, the process proceeds to step S1506.

In step S1506, it is determined whether or not the time when the face has been detected is longer than the predetermined time, and if it is longer, there is a high possibility that the subject is intentionally framed in the screen by the user, and it is considered that it is better to track the subject as the main subject candidate to some extent. Therefore, the process proceeds to step S1507, and the time before the subject tracking is stopped is adjusted. On the other hand, if it is short, there is a high possibility that the person is not intended by the user, such as when the subject appears on the screen for a moment and turns to the back, so the process ends without adjusting the time.

Although the conditions for extending the Sublimer have been described in the flowchart of FIG. 15, if the conditions imply that it is better not to track the main subject candidate for a long time as in the case of the main subject, the reset time before the subject tracking is stopped may be shortened. For example, if the panning of the camera is detected, it may be determined that it is intended to change the main subject, and the reset time may be shortened so as to stop tracking the subject whose face cannot be seen as the main subject candidate.

As described above, according to the second embodiment, the time since detection of a face which has been detected is failed until the tracking of the subject is stopped is set for each subject. In particular, the main subject should be tracked for a longer time, and the other subjects should be tracked for a shorter time than the main subject. This makes it possible to improve the tracking performance of the main subject in a situation where the face cannot be seen, and to realize an appropriate selection of the main subject according to the shooting situation.

In the above-described embodiments, the detection results of the face area and the head area of the person have been described, but the combination of the face area and the body area of the person, the combination of the face area and the head area or the body area of an animal, and the like may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-157676, filed on Sep. 18, 2020 which is hereby incorporated by reference herein in its entirety.

What is claimed is:
1. A focus adjustment apparatus comprising:
 a detection unit that detects one or more main subject candidates which are candidates for a main subject from image signals repeatedly output from an image sensor that performs photoelectric conversion on light that is incident through an imaging optical system based on a predetermined first condition;
a selection unit that selects the main subject from the one or more main subject candidates;
an acquisition unit that acquires operation information of an operation unit for moving a position of a focus lens included in the imaging optical system; and
a focus adjustment unit that controls the focus lens so as to focus on the main subject selected by the selection unit in a case where an autofocus mode is set and the operation unit is not operated,
wherein the selection unit selects the main subject based on an in-focus position of the focus lens and fixes the selected main subject in a case where the operation unit is operated, and
wherein each unit is implemented by one or more processors, circuitry or a combination thereof.

2. The focus adjustment apparatus according to claim 1, wherein the selection unit selects the main subject candidate located at a position nearest to the in-focus position of the focus lens as the main subject in a case where the operation unit is operated.

3. The focus adjustment apparatus according to claim 1, wherein the selection unit reselects the main subject in a case where the operation unit is operated and a focus state of the selected main subject is lower than a focus state set on the basis of a depth of focus of the focus lens.

4. The focus adjustment apparatus according to claim 3, wherein the acquisition unit acquires a moving direction of the in-focus position of the focus lens by operation of the operation unit, and
the selection unit reselects the main subject from the one or more main subject candidates that exist at positions in the moving direction of the in-focus position.

5. The focus adjustment apparatus according to claim 1, wherein, in a case where the operation unit is not operated and no main subject is fixed, the selection unit determines the main subject based on a predetermined second condition.

6. The focus adjustment apparatus according to claim 1, wherein the detection unit includes
a first detection unit that detects a first area having a first feature from the image signal; and
a second detection unit that detects a second area which relates to the first area and has a second feature from the image signal, and
the detection unit detects the one or more main subject candidates based on information of the first area and the second area.

7. The focus adjustment apparatus according to claim 6, wherein the first detection unit detects the first area using a third condition which differs between a case where the operation unit is operated and a case where the operation unit is not operated.

8. The focus adjustment apparatus according to claim 7, wherein the third condition includes a size whose smallest limit of an area to be detected as the first area is smaller in a case where the operation unit is operated than in a case where the operation unit is not operated.

9. The focus adjustment apparatus according to claim 7, wherein the third condition includes an area of an image where the first area is to be detected, and the first detection unit detects the first area within the area larger in a case where the operation unit is operated than in a case where the operation unit is not operated.

10. The focus adjustment apparatus according to claim 7, wherein the third condition includes reliability whose lowest limit of the area to be detected as the first area is made lower in a case where the operation unit is operated than in a case where the operation unit is not operated.

11. The focus adjustment apparatus according to claim 6, wherein the first condition is different between in a case where the operation unit is operated and in a case where the operation unit is not operated.

12. The focus adjustment apparatus according to claim 11, wherein, in a case where the operation unit is operated, the detection unit detects one or more subjects included in at least the first area or the second area as the main subject candidates and, in a case where the operation unit is not operated, the detection unit detects one or more subjects included in the first area and one or more subjects which have been detected as the main subject candidates in the past and included in the second area as the main subject candidates.

13. The focus adjustment apparatus according to claim 1 further comprising a display unit that displays an image based on the image signals output from the image sensor,
wherein, in a case where the autofocus mode is set and the operation unit is not operated, a first display item indicating the main subject selected by the selection unit is displayed on the image displayed on the display unit, and
in a case where the operation unit is operated, the first display item and a second display item indicating the main subject candidate detected by the detection unit are displayed on the image displayed on the display unit.

14. The focus adjustment apparatus according to claim 13 further comprising a setting unit that sets time for displaying the second display item since the main subject candidate is detected by the detection unit for each main subject candidate,
wherein the setting unit is implemented by one or more processors, circuitry or a combination thereof.

15. An image capturing apparatus comprising:
an image sensor; and
a focus adjustment apparatus comprising:
a detection unit that detects one or more main subject candidates which are candidates for a main subject from image signals repeatedly output from the image sensor that performs photoelectric conversion on light that is incident through an imaging optical system based on a predetermined first condition;
a selection unit that selects the main subject from the one or more main subject candidates;
an acquisition unit that acquires operation information of an operation unit for moving a position of a focus lens included in the imaging optical system; and
a focus adjustment unit that controls the focus lens so as to focus on the main subject selected by the selection unit in a case where an autofocus mode is set and the operation unit is not operated,
wherein the selection unit selects the main subject based on an in-focus position of the focus lens in a case where the operation unit is operated and fixes the selected main subject, and
wherein each unit is implemented by one or more processors, circuitry or a combination thereof.

16. The image capturing apparatus according to claim 15 further comprising the imaging optical system.

17. The image capturing apparatus according to claim 15, wherein the imaging optical system is detachable from the image capturing apparatus.

18. A focus adjustment method comprising:
  detecting one or more main subject candidates which are candidates for a main subject from image signals repeatedly output from an image sensor that performs photoelectric conversion on light that is incident through an imaging optical system based on a predetermined first condition;
  selecting the main subject from the one or more main subject candidates;
  acquiring operation information of an operation unit for moving a position of a focus lens included in the imaging optical system; and
  controlling the focus lens so as to focus on the selected main subject in a case where an autofocus mode is set and the operation unit is not operated,
  wherein the main subject is selected based on an in-focus position of the focus lens and the selected main subject is fixed in a case where the operation unit is operated.

19. A non-transitory computer-readable storage medium, the storage medium storing a program that is executable by the computer, wherein the program includes program code for causing the computer to function as a focus adjustment apparatus comprising:

a detection unit that detects one or more main subject candidates which are candidates for a main subject from image signals repeatedly output from an image sensor that performs photoelectric conversion on light that is incident through an imaging optical system based on a predetermined first condition;
  a selection unit that selects the main subject from the one or more main subject candidates;
  an acquisition unit that acquires operation information of an operation unit for moving a position of a focus lens included in the imaging optical system; and
  a focus adjustment unit that controls the focus lens so as to focus on the main subject selected by the selection unit in a case where an autofocus mode is set and the operation unit is not operated,
  wherein the selection unit selects the main subject based on an in-focus position of the focus lens and fixes the selected main subject in a case where the operation unit is operated.

* * * * *